(12) United States Patent
Hasegawa et al.

(10) Patent No.: US 8,446,942 B2
(45) Date of Patent: May 21, 2013

(54) WAVEFORM EQUALIZATION CIRCUIT AND WAVEFORM EQUALIZATION METHOD

(75) Inventors: Hideyuki Hasegawa, Tokyo (JP); Kazuhisa Sunaga, Tokyo (JP); Kouichi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 234 days.

(21) Appl. No.: 12/919,631

(22) PCT Filed: Mar. 6, 2009

(86) PCT No.: PCT/JP2009/054339
§ 371 (c)(1),
(2), (4) Date: Aug. 26, 2010

(87) PCT Pub. No.: WO2009/113462
PCT Pub. Date: Sep. 17, 2009

(65) Prior Publication Data
US 2010/0327924 A1   Dec. 30, 2010

(30) Foreign Application Priority Data

Mar. 11, 2008  (JP) ................................ 2008-061211
Sep. 18, 2008  (JP) ................................ 2008-238845

(51) Int. Cl.
*H03H 7/30*      (2006.01)
(52) U.S. Cl.
USPC ........... 375/233; 375/226; 375/229; 375/230; 375/232; 375/234; 375/326; 375/340; 375/348; 375/350; 333/18; 333/28 R; 708/300; 327/155
(58) Field of Classification Search
USPC .............. 375/226, 229, 230, 232, 233, 234, 375/326, 340, 348, 350; 333/18, 28 R; 708/300; 327/155
See application file for complete search history.

(56) References Cited

U.S. PATENT DOCUMENTS 4,878,232 A * 10/1989 Fisher ........................ 375/362
2010/0046600 A1 * 2/2010 Zerbe et al. .................. 375/233

FOREIGN PATENT DOCUMENTS

| JP | 7-15381 A | 1/1995 |
| JP | 7-302467 A | 11/1995 |
| JP | 2004242327 A | 8/2004 |
| JP | 2005020750 A | 1/2005 |
| WO | 2006030011 A | 3/2006 |
| WO | 2007037312 A | 4/2007 |

OTHER PUBLICATIONS

International Search Report for PCT/JP2009/054339 mailed Jun. 9, 2009.

(Continued)

*Primary Examiner* — Leon Flores

(57) ABSTRACT

A waveform equalization circuit includes: a decision feedback equalization unit that feeds back and equalizes an input signal; a clock phase adjustment unit that adjusts a clock phase of a signal equalized by the decision feedback equalization unit based on a signal determined with a prescribed potential as a threshold; and a duo-binary decoder that encodes, into a duo-binary signal, the signal determined with the prescribed potential as a threshold based on a clock adjusted by the clock phase adjustment unit from the signal equalized by the decision feedback equalization unit; wherein the equalized signal is generated by adding the duo-binary signal encoded by the duo-binary decoder to the input signal. A first post-tap of the input signal is equalized by the clock phase adjustment unit without feedback equalization by the decision feedback equalization unit. Second and subsequent post-taps of the input signal are fed back and equalized by the decision feedback equalization unit.

23 Claims, 18 Drawing Sheets

OTHER PUBLICATIONS

K. Yamaguchi et al., "12Gb/s duobinary signalling with x2 oversampled edge equalization", IEICE Technical Report, vol. 105, No. 96, May 20, 2005, pp. 13-18.

* cited by examiner (1)

(2)

(3)

(1) PRECODER (2) DECODER (a) PRE-PHASE ADJUSTMENT SINGLE BIT RESPONSE (b) POST-PHASE ADJUSTMENT SINGLE BIT RESPONSE

WAVEFORM EQUALIZATION CIRCUIT AND WAVEFORM EQUALIZATION METHOD

DESCRIPTION OF RELATED APPLICATIONS

The present invention is the National Phase of PCT/JP2009/054339, filed Mar. 6, 2009, which is based upon and claims the benefit of the priority of Japanese Patent Application No. 2008-61211 (filed on Mar. 11, 2008) and Japanese Patent Application No. 2008-238845 (filed on Sep. 18, 2008), the disclosures of which are incorporated herein in their entirety by reference thereto.

TECHNICAL FIELD

The present invention relates to a waveform equalization circuit and to a waveform equalization method.

BACKGROUND

Accompanying the development of digital technology and the spread of high speed Internet in recent years, there is a demand for higher performance in personal computers, commercial consumer devices that require high capacity digital data processing, and routers and servers for data communication processing for such devices. Accompanying this, increasingly large capacities of band width for inter-chip communication I/O are being promoted, and there is a demand for wired communication technology that enables large capacity communication at low cost. In particular, regarding inter-chip wired communication of 10 gigabits or more, in a communication transmission board, waveform attenuation occurs due to cable skin effect or dielectric loss, and waveform distortion is very large, so that high speed waveform equalization technology is becoming necessary.

Patent Document 1 discloses decision feedback equalizer (DFE) technology in which a decision feedback signal is at full rate (1 bit time) for binary transmission. A configuration is such that, in a case where a received signal is 1, a signal multiplied by a prescribed gain in a DAC from a digital signal determined by a sampler, is fed back to an adder before the sampler, addition or subtraction of a signal waveform of a subsequent bit is performed, and intersymbol interference (ISI) generated subsequently is eliminated. As a result, it is possible to eliminate the ISI generated particularly markedly in a high speed serial link.

[Patent Document 1]
JP Patent Kokai Publication No. JP2005-020750A

SUMMARY

The matter disclosed in the abovementioned Patent Document 1 is incorporated herein by reference thereto. The following analysis is given by the present invention. The technology described in Patent Document 1, however, has the following problems. Specifically, in a decision feedback equalizer circuit described in Patent Document 1, a decision signal detected by a sampler at a certain clock timing, must be added to or subtracted from the next bit signal waveform, until the sampler detects the next bit. In particular, in a case of eliminating first post-tap ISI, since it is necessary to make a digital decision and feedback thereof from a small amplitude analog signal waveform before the sampler, speeding up of communication is restricted. This problem exists in the same way for decision feedback to obtain a duo-binary signal.

Therefore, it is an object of the present invention to provide a waveform equalization circuit and a waveform equalization method that can overcome problems of the waveform equalization circuit concerned, and can realize high capacity communication and high speed communication.

In order to achieve the abovementioned object, in a first aspect of the present invention there is provided a waveform equalization circuit that controls a clock phase of a receiving circuit and changing signal detection timing, first post-tap intersymbol interference is controlled and equalized to obtain a duo-binary signal.

In a second aspect there is provided a waveform equalization method, by controlling a clock phase of a receiving circuit and changing signal detection timing, first post-tap intersymbol interference is controlled and equalized to obtain a duo-binary signal.

In a third aspect there is provided a data transmission system that includes a transmission circuit that performs pre-emphasis on a duo-binary signal to be output to a transmission line; a receiving circuit including: a decision feedback equalization circuit that feeds back and equalizes a signal received from the transmission line, and a clock phase adjustment circuit that equalizes by adjusting a phase of a clock deciding and taking in a phase of a signal received from the transmission line; and a waveform equalization tap coefficient control circuit that, based on a received result of the receiving circuit, controls a tap on which said transmission circuit performs pre-emphasis, and a feedback equalization count of the decision feedback equalization circuit.

According to the present invention, a waveform equalization circuit and a waveform equalization method that can realize high capacity communication and high speed communication are possible.

EXPLANATIONS OF SYMBOLS

Figure 1:
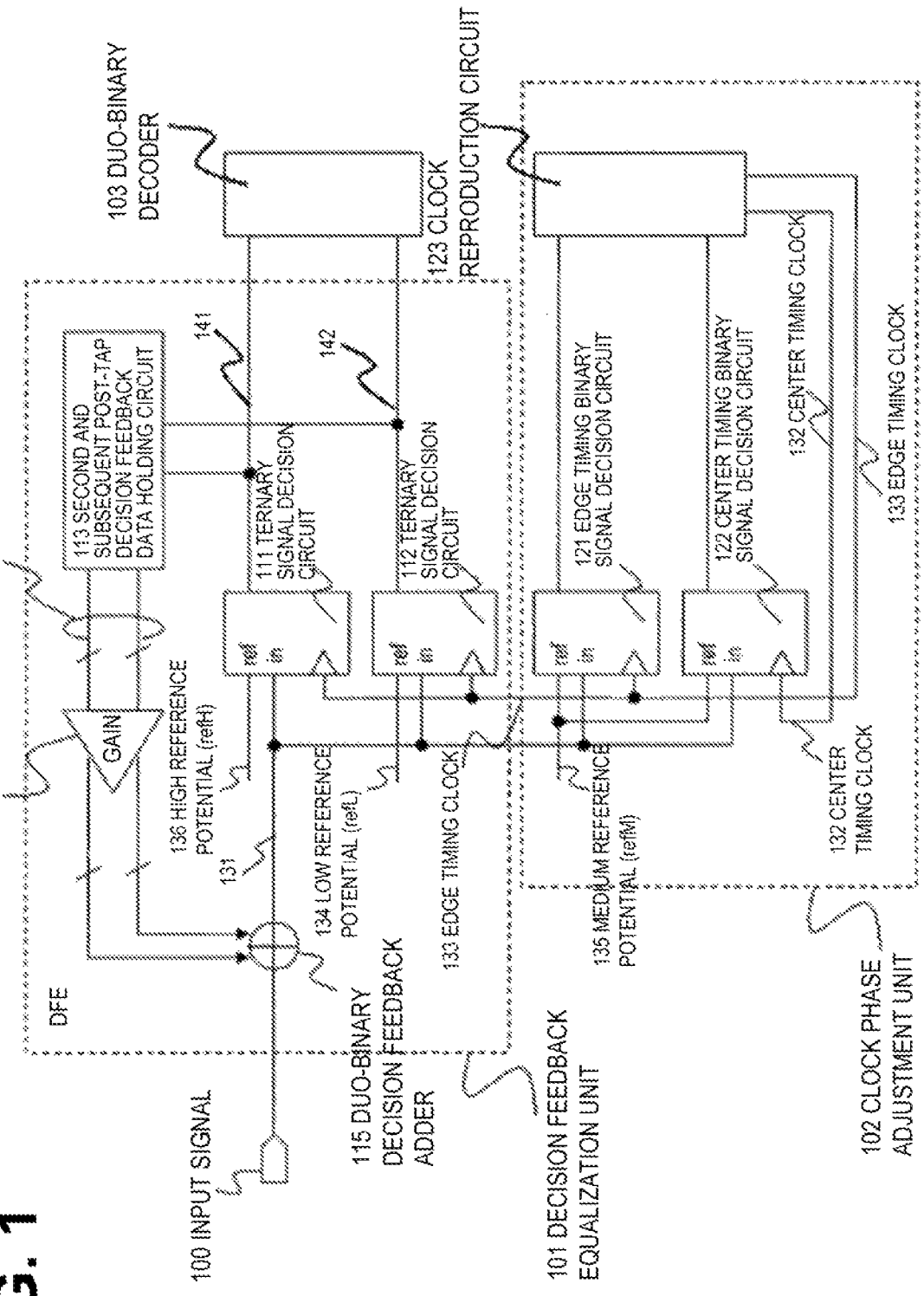
FIG. 1 is a drawing showing an example of a waveform equalization circuit in a first exemplary embodiment of the present invention.

Refer to the end of the Description for explanation of symbols.

Preferred Modes

The following preferable modes of respective aspects of the present invention are possible.

In a first aspect, there is provided a waveform equalization circuit to obtain a duo-binary waveform, including a signal detection circuit that can make a ternary decision by an edge timing clock.

Furthermore, there is provided a waveform equalization circuit to obtain a duo-binary signal, including a mechanism for detecting a phase of zero threshold by the edge timing clock.

Furthermore, there is provided a waveform equalization circuit to obtain a duo-binary signal, that detects a phase of 0 threshold by the edge timing clock, by performing over-sampling with respect to symbol rate.

Furthermore, there is provided a waveform equalization circuit to obtain a duo-binary waveform, including a circuit that performs decision feedback equalization of second and subsequent post-tap intersymbol interference, and performing equalization of first post-tap intersymbol interference.

Furthermore, there is provided a waveform equalization circuit to obtain a duo-binary waveform, including an ×2 over-sampling clock reproduction circuit (CDR) that inputs a binary decision data detected by the edge timing clock and a center timing clock, or a data group obtained by demultiplexing these data.

Furthermore, there is provided a waveform equalization circuit to obtain a duo-binary waveform, including a feedback path in which a decision feedback time limitation in decision feedback equalization is shortest is fed back independently from another feedback path.

Furthermore, there is provided a waveform equalization circuit to obtain a duo-binary waveform, including a decision feedback data path for decision feedback equalization of second post-tap intersymbol interference, which is independent of a data path group for decision feedback equalization of third and subsequent post-tap intersymbol interference.

Furthermore, there is provided a waveform equalization circuit for obtaining a duo-binary waveform, in a case of a signal in which an input signal level is higher than a high threshold level of a ternary signal detection circuit, +1 is fed back to positive input and 0 is fed back to negative input of a decision feedback signal differential pair of a duo-binary decision feedback adder; in a case of a signal lower than a low threshold level, 0 is fed back to positive input and +1 is fed back to negative input of the decision feedback signal differential pair of the duo-binary decision feedback adder; and in a case of a signal between the high threshold and the low threshold, +1 is fed back to positive input and +1 is fed back to negative input of the decision feedback signal differential pair of the duo-binary decision feedback adder.

In a second aspect, there is provided an equalization method of performing decision feedback equalization on a receiving side with respect to second and subsequent post-tap intersymbol interference. Furthermore, there is provided an equalization method of equalizing by performing pre-emphasis on a transmission side with regard to the pre-tap intersymbol interference.

In a third aspect, there is provided a data transmission system in which equalization is performed by pre-emphasis of a transmission circuit with regard to a pre-tap of a duo-binary signal, equalization is performed by a clock phase adjustment circuit, without performing equalization by a decision feedback equalization circuit, with regard to a first post-tap of a duo-binary signal, and equalization is performed by the decision feedback equalization circuit for second and subsequent post-taps of a duo-binary signal. Furthermore, there is provided a data transmission system in which a time constant of an adjustment loop by a clock phase adjustment circuit is larger than a time constant of an adjustment loop by a waveform equalization tap coefficient control circuit.

A description is given below concerning embodiments for realizing the present invention, making reference to the drawings.

First Exemplary Embodiment (Configuration Description)

FIG. 1 is a drawing showing a configuration of a waveform equalization circuit according to a first exemplary embodiment of the present invention. The waveform equalization circuit according to one exemplary embodiment of the present invention is a duo-binary equalization circuit. Reference numeral 101 denotes a decision feedback equalization unit, 102 denotes a clock phase adjustment unit, 103 denotes a duo-binary decoder, and 100 denotes an input signal.

The decision feedback equalization unit 101 includes two signal decision circuits (signal detection circuits) 111 and 112 that make a decision concerning a ternary value at edge timing; a second and subsequent post-tap decision feedback data holding circuit 113 that holds data for decision feedback equalization of a decision result of the two signal decision circuits 111 and 112; a gain stage 114, and a duo-binary decision feedback adder 115.

The clock phase adjustment unit 102 includes a signal decision circuit 122 that can make a decision concerning a binary value by a center timing clock 132, a signal decision circuit 121 that enables a decision concerning a binary value by an edge timing clock 133, and a clock reproduction circuit (CDR) 123 that adjusts clock phase from output of the above-mentioned two signal decision circuits.

The input signal 100 is received by the decision feedback equalization unit 101, and a signal 131 that has undergone second and subsequent post-tap decision feedback equalization is received by the ternary value signal decision circuits 111 and 112 of the decision feedback equalization unit 101, and the binary value signal decision circuits 121 and 122 of the clock phase adjustment unit 102.

Figure 2:
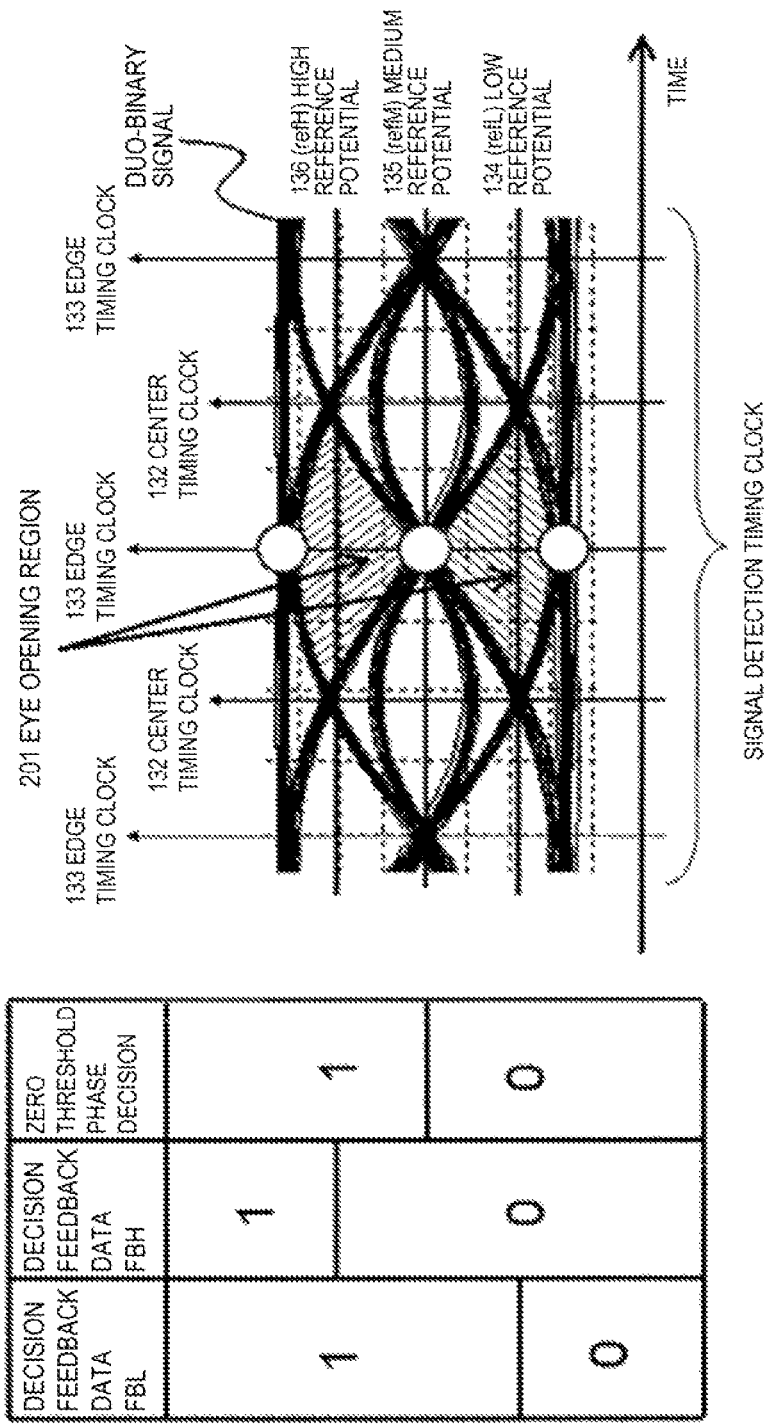
FIG. 2 is a drawing showing an example of a duo-binary signal waveform in the first exemplary embodiment.

Next, using FIG. 2, definitions are shown for a duo-binary signal waveform, and clock timing, reference potential, and decision data used in the exemplary embodiment of the present invention.

With regard to the duo-binary signal, in order that an eye opening region 201 of FIG. 2 forms a data eye pattern, and to have between a high reference potential 136 (refH) and a low reference potential 134 (refL) as data 1, and outside of this, a region of potential higher than the high reference potential 136 (refH) and a region of potential lower than the low reference potential 134 (refL) as data 0, generally coding is performed from a binary signal to obtain a duo-binary signal in a transmission circuit. As a result, in contrast to center clock timing 132 being data decision timing in binary transmission, timing of the edge clock 133 is data decision timing in duo-binary transmission.

The ternary signal decision circuit 111 makes a decision concerning a signal with the high reference potential 136 (refH) as a threshold, and output thereof is decision feedback data FBH. The ternary decision signal detection circuit 112 makes a decision concerning a signal with the low reference potential 134 (refL) as a threshold, and output thereof is decision feedback data FBL. As shown in FIG. 2, in a case of a potential higher than the threshold, decision data is 1, and in a case of a potential lower than the threshold, decision data is 0.

Among the two ternary signal decision circuits 111 and 112, the high reference potential 136 (refH) is inputted to the signal decision circuit 111, and the low reference potential 134 (refL) is inputted to the signal decision circuit 112. A medium reference potential 135 (refM) is inputted to the two binary signal detection circuits 121 and 122.

It is to be noted that in the present exemplary embodiment, a similar effect is obtained with a single end configuration and a differential configuration. In particular, in a case in which the binary signal detection circuits 121 and 122 are in a differential configuration, a decision result the same as the case where the medium reference potential 135 (refM) is used can be obtained with only a differential signal decision, and it is possible to omit the medium reference potential 135 (refM). In the same way, with the ternary signal decision circuit 111, for a differential input signal it is possible to use the low reference potential 134 (refL) as a decision threshold, and with the ternary signal decision circuit 112, for a differential input signal it is possible to use the low reference potential 136 (refH) as a decision threshold.

Figure 3:
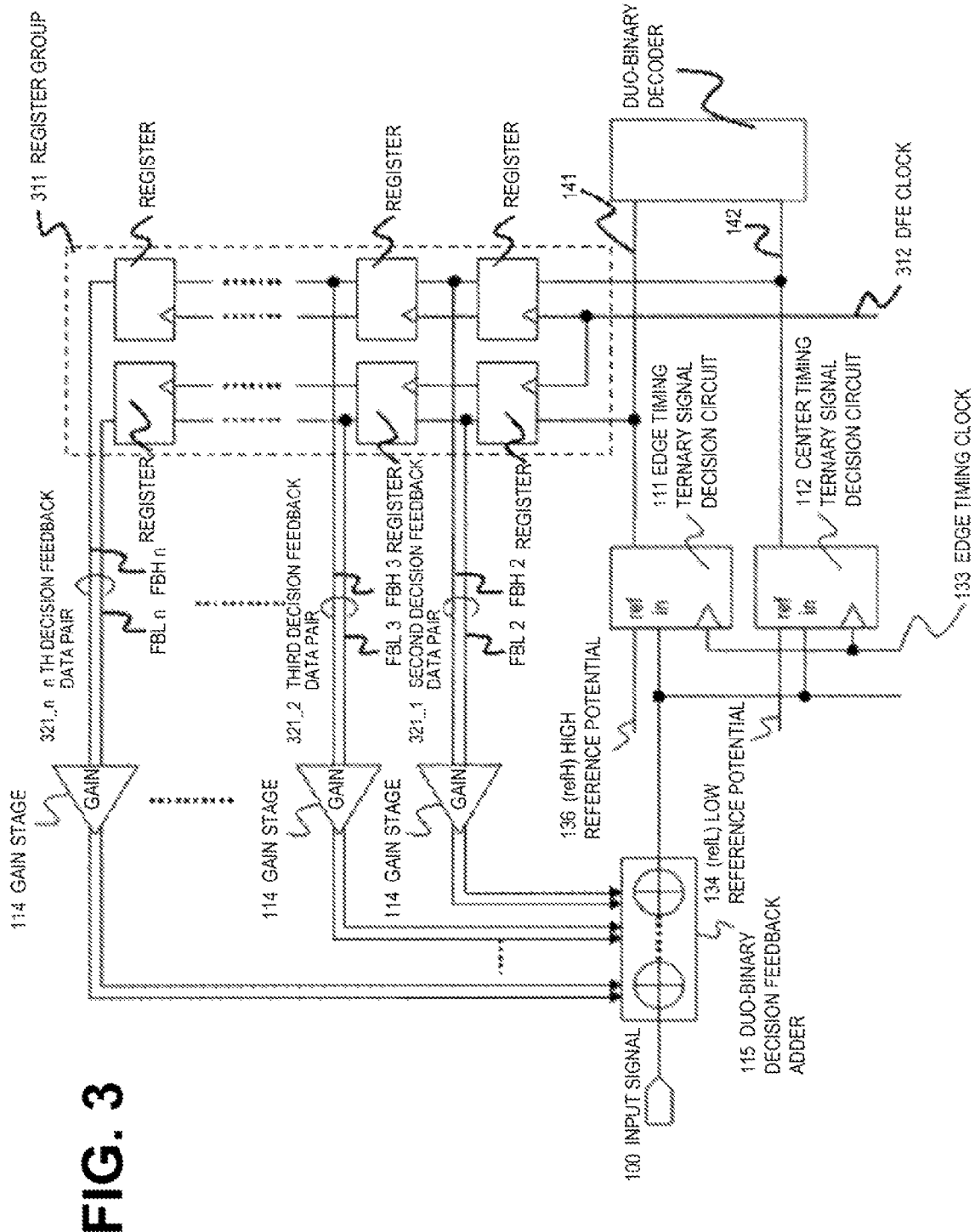
FIG. 3 is a drawing showing an example of a waveform feedback equalization unit in the first exemplary embodiment.

Next, using FIG. 3, a detailed description is given below concerning component elements of the decision feedback equalization unit 101.

In order to perform decision feedback equalization to obtain a duo-binary signal, ternary decision results 141 and 142 before input to the duo-binary decoder 103 are held as data in a register group 311, for the number (n) of taps in decision feedback equalization (DFE). A DFE clock 312 that drives the register 311 group is generally the edge timing clock 133, but phase may be shifted in order to adjust feedback timing. A decision feedback data pair group (321_1, 321_2, . . . 321_N) that is held is multiplied by gain corresponding to each tap coefficient of the decision feedback equalization (DFE) in a gain stage 114, fed back to the duo-binary decision feedback adder 115, and the input signal 100 is equalized to obtain a duo-binary waveform.

Figure 4:
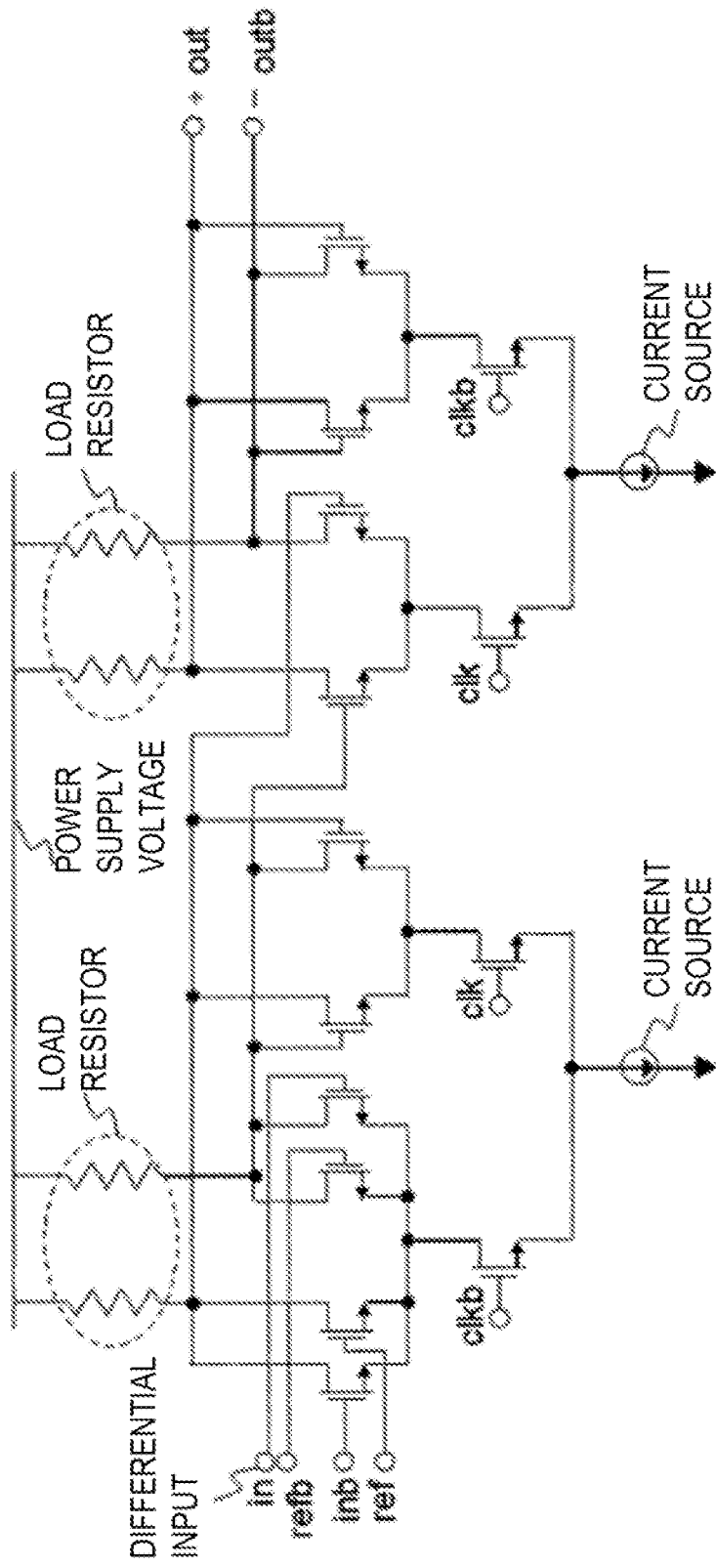
FIG. 4 is a drawing showing an example of a duo-binary signal decision circuit in the first exemplary embodiment.

FIG. 4 shows an example of ternary decision differential signal detection circuits 111 and 112. A general flip-flop type signal detection circuit is shown, but a circuit that can correctly decide data, such as a sampling latch of a regenerative latch type, or an offset generation amplification circuit, a circuit combining a general flip-flop and sampling latch, or the like, is also possible.

Figure 5:
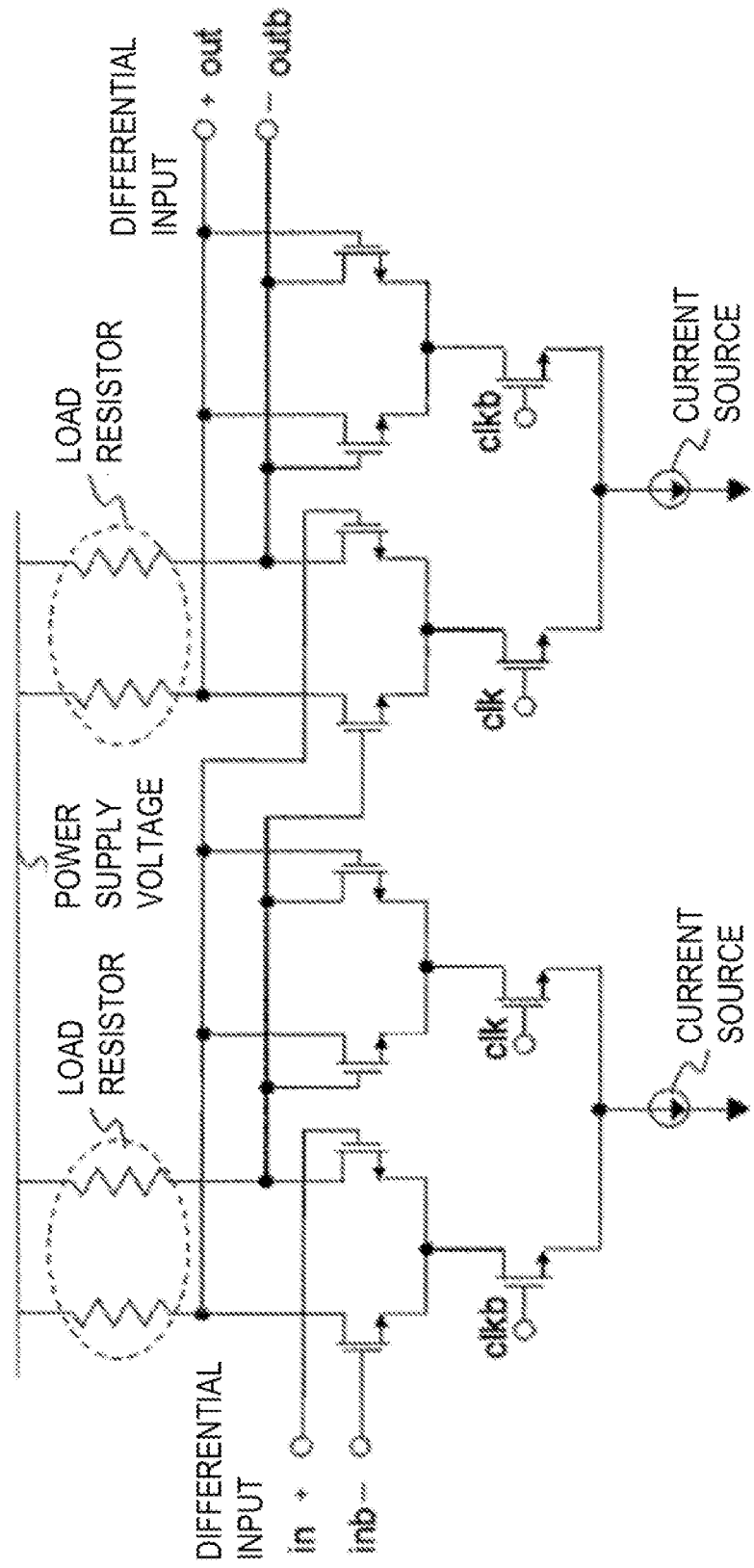
FIG. 5 is a drawing showing an example of registers in the first exemplary embodiment.

FIG. 5 shows an example of the register group 311. There is no limitation to this, and a circuit that can latch data is also possible.

Figure 6:
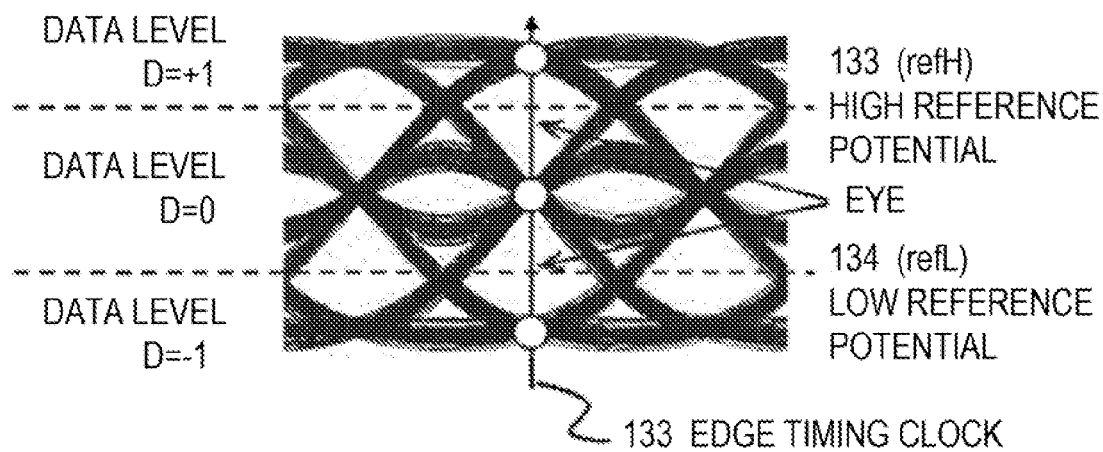
FIG. 6 is a drawing showing an example of a duo-binary decision feedback equalization method in the first exemplary embodiment.

Using FIG. 6, a detailed description is given of the duo-binary decision feedback adder 115. A description is given concerning each decision feedback operation in cases where the ternary decision data has data levels D=+1, D=0, and D=−1, in FIG. 6. In a case where a decision result is a potential greater than or equal to the high reference potential 136 (refH), that is, D=+1, an adder corresponding to this tap subtracts a voltage multiplied by gain in the gain stage. Furthermore, in a case where a decision result is a potential less than or equal to the low reference potential 134 (refL), an adder corresponding to this tap adds a voltage multiplied by gain in the gain stage. Finally, in a case where a ternary decision is determined to be between the low reference potential 133 (refL) and the high reference potential 136 (refH), an adder corresponding to this decision feedback tap does not perform an adding operation (adds 0).

Figure 7:
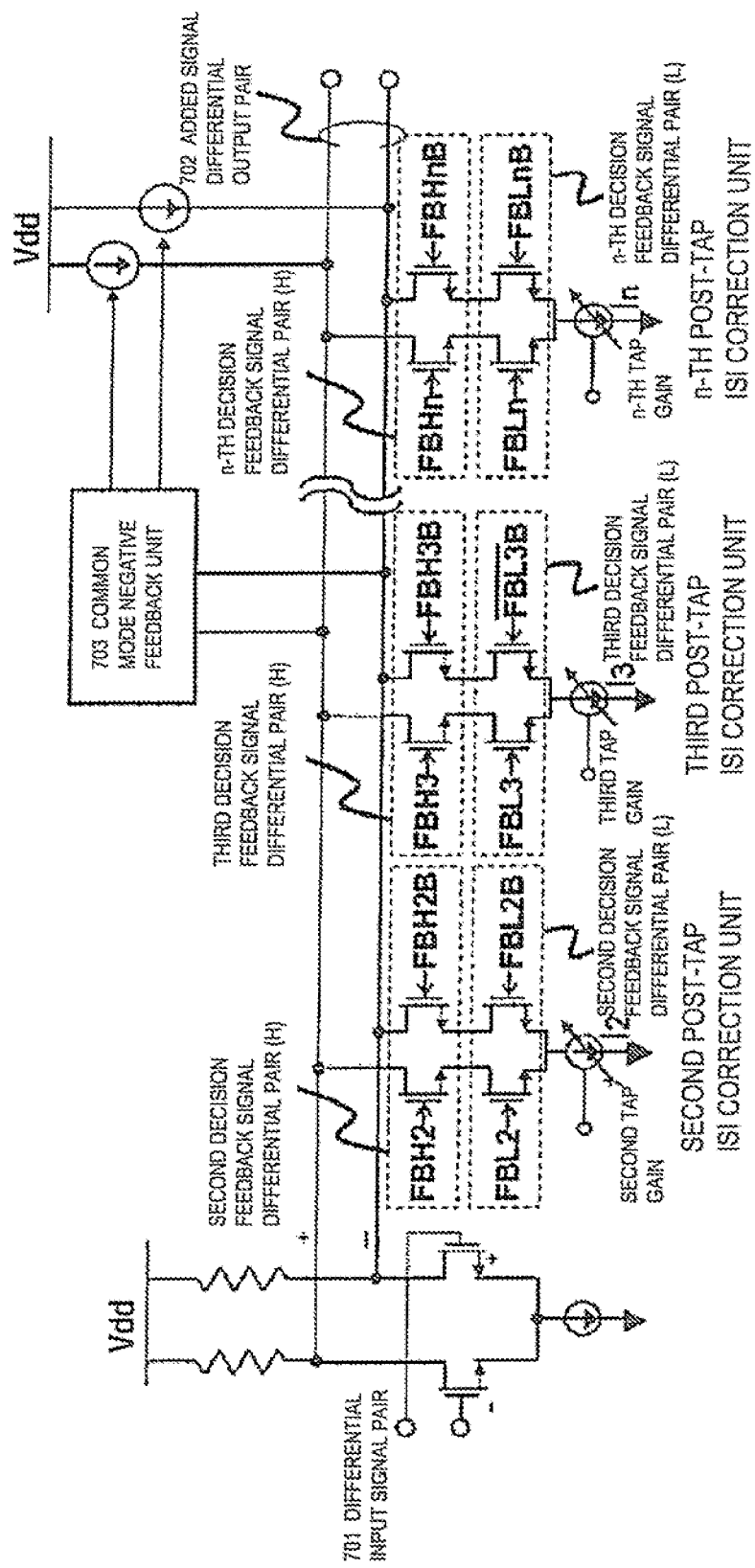
FIG. 7 is a drawing showing an example of a duo-binary decision feedback adder in the first exemplary embodiment.

FIG. 7 shows an example of a differential configuration of a decision feedback equalization operation to obtain this duo-binary signal. A differential decision feedback signal pair FBHk and FBHkB of the ternary decision signal detection circuit 111 having a k-th tap (k is an integer, from 2 to n) high reference potential 136 (refH) as a threshold, and a differential decision feedback signal pair FBLk and FBLkB of the ternary decision signal detection circuit 112 having the low reference potential 132 (refL) as a threshold, are fed back to a corresponding k-th post-tap ISI correction unit. In response to a logical AND of the decision values FBHk (FBHkB) and FBLk (FBLkB) of each of the signal decision circuits 111 and 112, an adding operation is performed to an addition signal differential output pair 702. Here, in the example of FIG. 7, an operation equivalent to the gain stage 114 in FIGS. 1 and 3 is realized by control of a ratio of current amount (I1, I2m, . . . , In) of a current source of each post-tap ISI correction unit, to a ratio of each tap gain. Furthermore, although not shown in the drawings, a switch circuit is provided that switches and inputs a differential pair that performs feedback in a case where a control tap coefficient is negative, and implementation can be done by performing this switch. In the present exemplary embodiment, an example is shown in which a common mode negative feedback unit 703 is installed, in order to control an in-phase potential (common mode potential) of a differential output pair 702 of the duo-binary decision feedback adder 115. Furthermore, the duo-binary decision feedback adder 115 need not particularly be as in the present exemplary embodiment, and a configuration is possible in which logical AND results of the two ternary decision signal detection circuits 111 and 112 can be multiplied by gain equivalent to each tap coefficient, and these results can be added to or subtracted from the input signal.

Next, a description is given below concerning details of a configuration of the clock phase adjustment unit 102. In order to equalize the first post-tap ISI to obtain a duo-binary signal, in the present invention, clock phase is controlled so that signal waveforms at a first post-tap timing and main tap timing of an edge timing clock are both a 0 threshold. (Here, the 0 threshold corresponds to the medium reference potential (refM) of FIG. 2. In addition, reference is made to a lower drawing in FIG. 11). Therefore, it is adequate to have a phase detection mechanism for the edge timing clock 133 at the 0 threshold, and a mechanism which, from this detection result, controls the edge timing clock so that the potential of the main tap and the first post-tap have a 0 threshold.

Although the duo-binary first post-tap ISI equalization of the present invention has a different object, it is possible to implement the abovementioned operation by building into the present configuration the clock data reproduction circuit (CDR) of a double over-sampling type used generally in a binary transmission receiving circuit. A general double oversampling CDR is provided with an edge (data transition) detection mechanism necessary for clock reproduction, that is, a phase detection mechanism for the edge timing clock with the abovementioned ternary decision at a 0 threshold.

Figure 8:
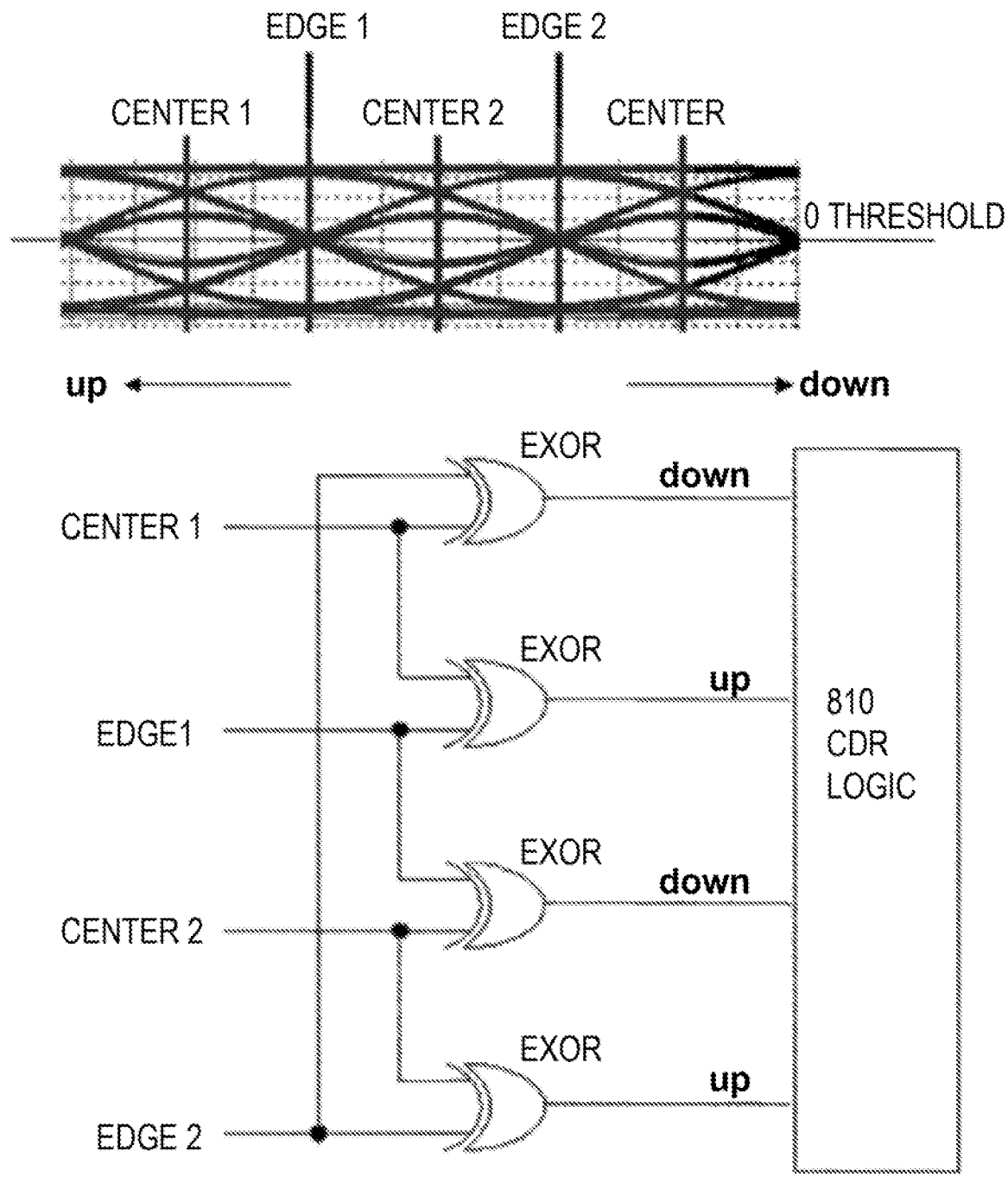
FIG. 8 is a drawing showing an example of a phase detection circuit in the first exemplary embodiment.

FIG. 8 shows an example of a general phase comparison circuit. By performing a exclusive OR (EXOR) operation of data and edge, and that edge and subsequent data, a detection is made as to whether a reproduction clock phase is advanced or delayed with respect to the input data.

Figure 9:
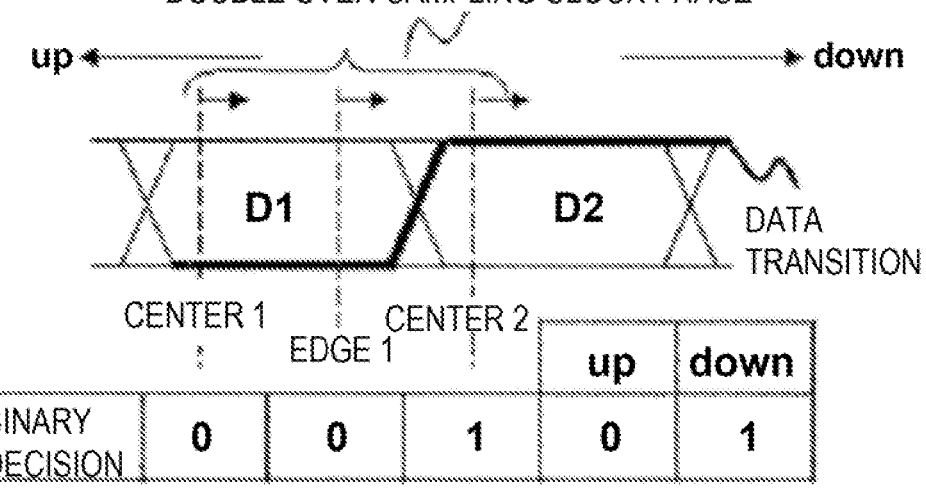
FIG. 9 is a drawing showing an example of phase detection in a clock data reproduction circuit in the first exemplary embodiment.
Figure 9:
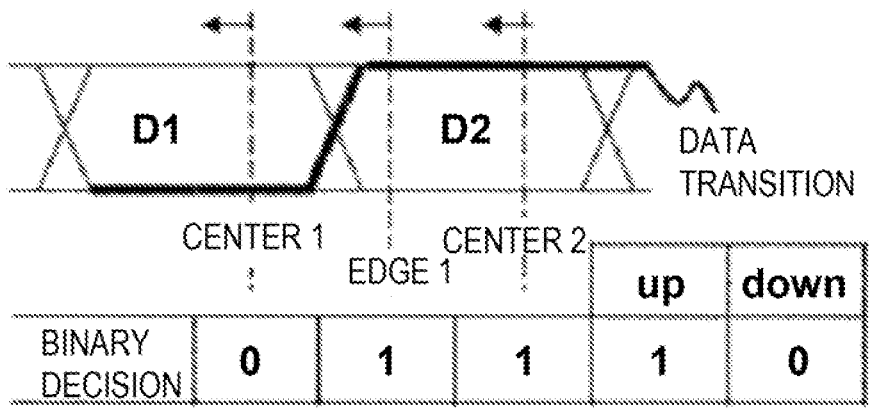
Figure 9:
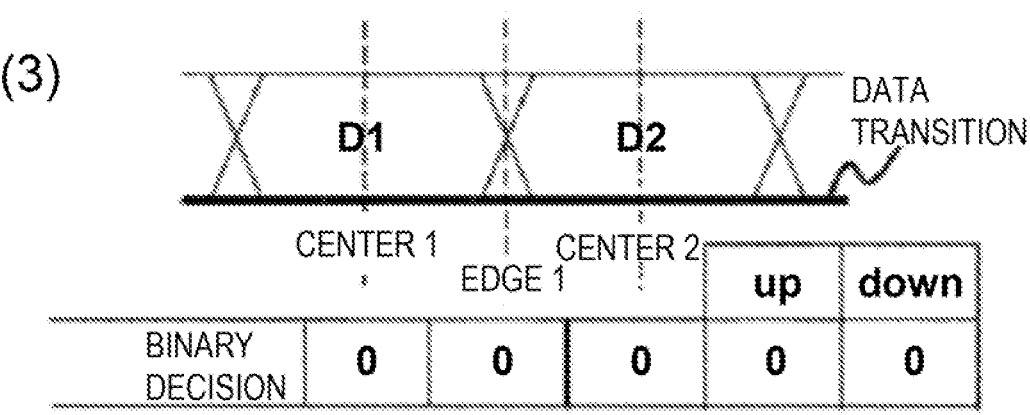

FIG. 9 is a phase detection operation example of the phase detection circuit of FIG. 8. A circuit is used in which binary decision data of center timing that has been 1:2 de-multiplexed and a binary decision data group at edge timing are inputted, in order of detection, two-by-two, to exclusive OR (EXOR) logic. As a result of an exclusive OR operation in a signal state in which timing of an edge is (1) when data transitions from 0-->1, an up signal=0 and a down signal=1, and a detection is made that a clock phase is advanced with respect to the data. Based on this up/down signal, CDR logic 810 performs control so that the clock shifts to a down side. Conversely, in a signal state of (2), an up signal=1 and a down signal=0, and a detection is made that the clock phase is delayed with respect to the data. Based on this up/down signal, the CDR logic 810 performs control so that the clock phase shifts to an up side. Furthermore, in a case where the data does not transition from 0-->0, as in (3), the up signal=down signal=0, and the clock phase is not adjusted. Even if, in the abovementioned operation, the data transition is not from 0 to 1 but from 1 to 0, an equivalent phase detection is possible by an EXOR operation.

By the abovementioned operation, an operation is possible having an object wherein the CDR of the present exemplary embodiment controls the edge timing clock phase to a 0 threshold in FIG. 8. Furthermore, it is possible to control the edge timing clock to edge timing that is an eye center phase of the duo-binary signal, at the same time.

However, since the present invention has a characteristic in that the duo-binary signal must go through a 0 level at a symbol rate when there is a level transition from a −1 level, shown in FIG. 6, to a +1 level, there is no problem in phase detection at 0 threshold using a symbol rate CDR without using the over sampling CDR.

Figure 10:
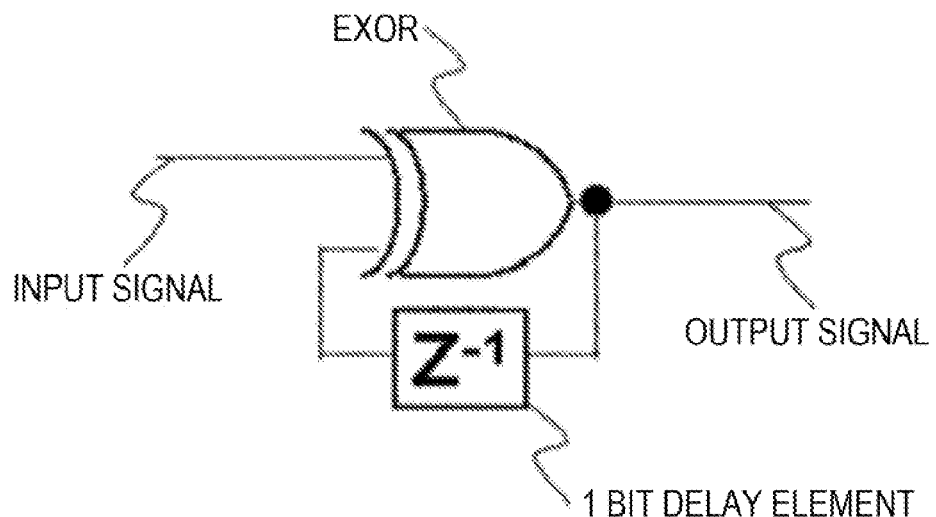
FIG. 10 is a drawing showing an example of a duo-binary precoder and decoder in the first exemplary embodiment.
Figure 10:
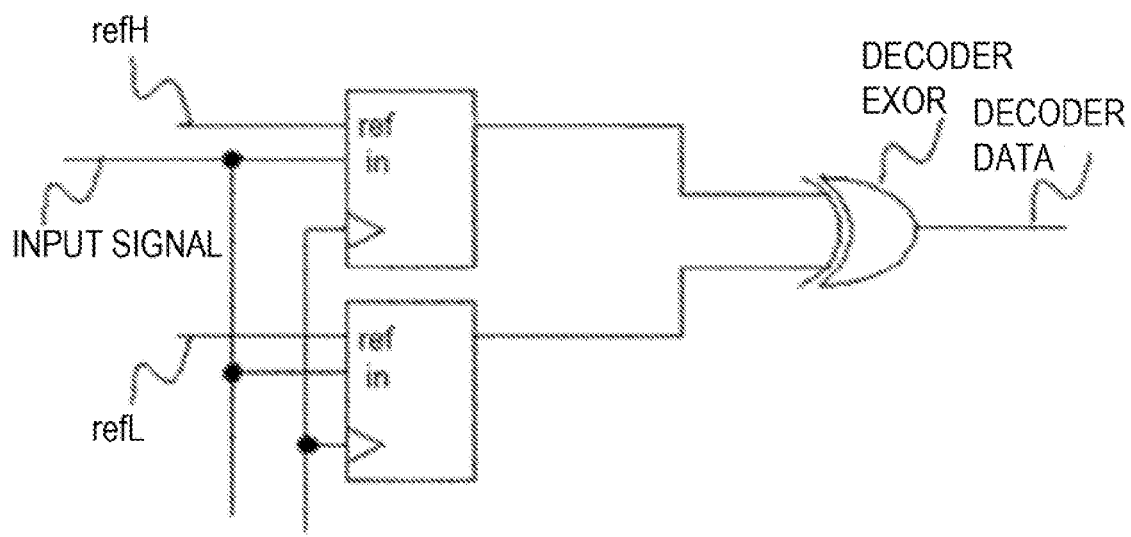

FIG. 10 is an example of a duo-binary precoder and decoder. In duo-binary communication, in order to prevent error propagation, in general when transmitting, a precoder circuit encodes transmission data. Logic is necessary for decoding this encoding and for converting a duo-binary decision result to binary data. In the abovementioned precoder, an exclusive OR (EXOR) operation of its own data and data 1 bit before, is performed. As a result, in the duo-binary waveform, data is 1 in between the high reference potential 136 (refH) and the low reference potential 134 (refL), and data is 0 on the outside. Therefore, on a receiving side it is possible to make a ternary decision concerning the duo-binary waveform at an edge timing clock, and to convert a decision result thereof to binary data by an EXOR operation.

(Description of Operation)

Figure 11:
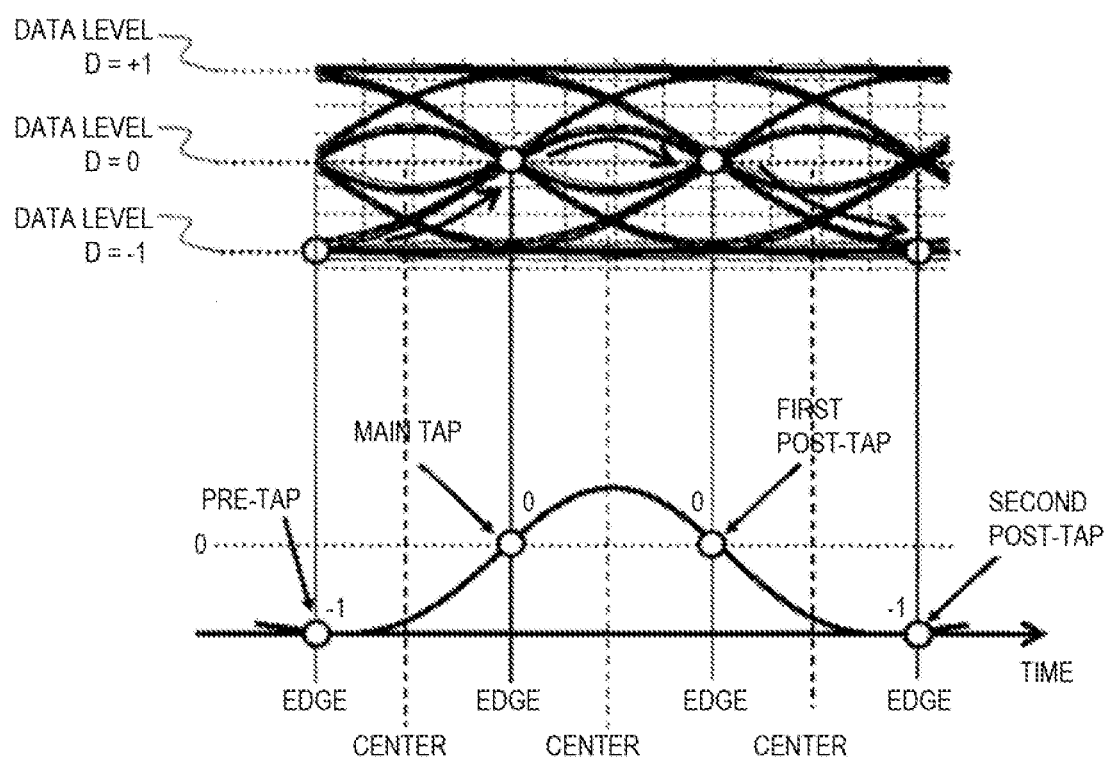
FIG. 11 is a drawing showing an example of a duo-binary signal eye pattern and single bit response in the first exemplary embodiment.

Next, using drawings from FIG. 11 onwards, as an example of operation of the present exemplary embodiment a description is given of waveform equalization from a response waveform, in a case where a single bit 0 . . . 010 . . . 0 is transmitted by a transmission circuit, to a duo-binary signal.

FIG. 11 is a drawing showing an eye pattern and a single bit response of the duo-binary signal. When a single bit in a bit period is equalized to obtain a duo-binary waveform, the situation is as in a lower drawing of FIG. 11. In a case where a post ternary decision level is −1, 0, and +1, a single bit response with a duo-binary waveform is −1, 0, 0, −1. A duo-binary signal ternary decision is determined by an edge timing clock as described above, and a pre-tap, main-tap, first post-tap, and second post tap are defined as in FIG. 11.

Therefore, the duo-binary waveform equalization of the present invention has as an object performing control so that a level relationship at the data decision timing of the single bit response is such that the main tap potential=the first post-tap potential, and the pre-tap potential=the potential of second and subsequent post-taps.

Figure 12:
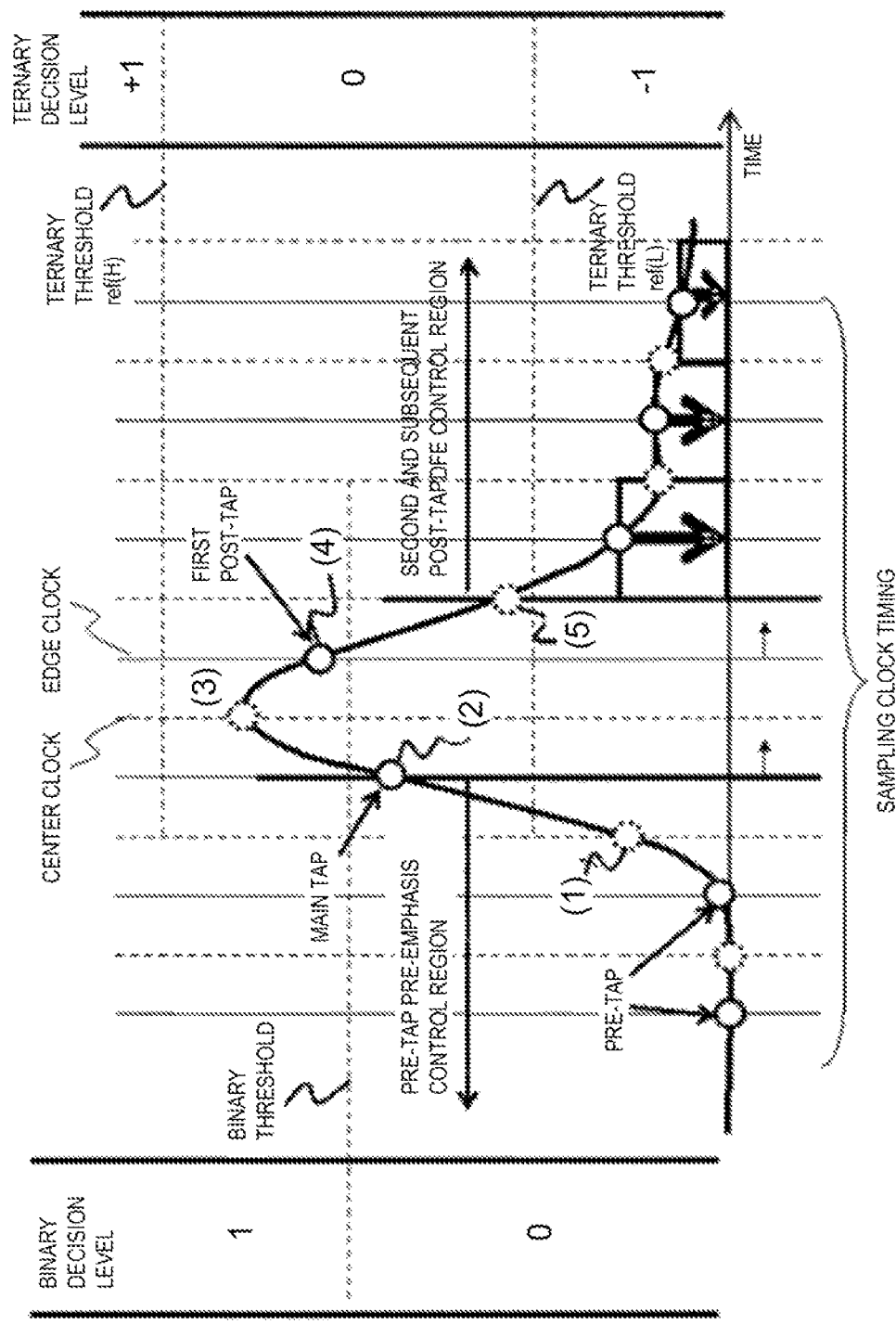
FIG. 12 is a drawing showing an example of a single bit response before waveform equalization in the first exemplary embodiment.
Figure 13:
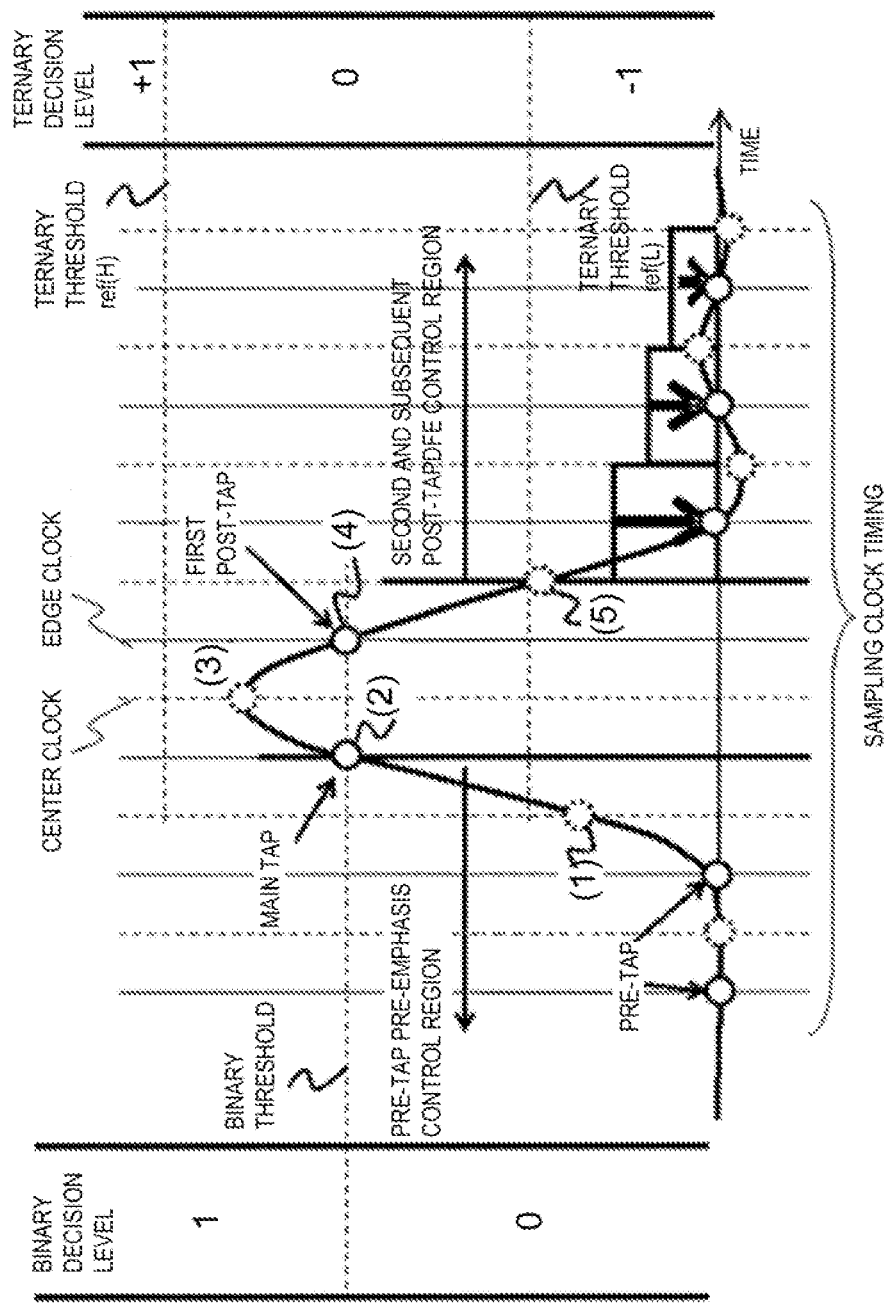
FIG. 13 is a drawing showing an example of a single bit response before waveform equalization in the first exemplary embodiment.

Based on this definition, FIG. 12 shows a single bit response before waveform equalization and FIG. 13 shows a single bit response after waveform equalization; an edge timing clock, which is data decision timing that should be equalized, is shown by a vertical full line, and a center timing clock necessary for clock phase adjustment of ×2 over sampling CDR is shown by a vertical broken line. In the present invention, for the second and subsequent post-taps, DFE control is performed; for the pre-tap control is performed by pre-emphasis on a transmission side; and in the proposed example below, the potential of the first post-tap and the main tap is shown to be equalized by clock control.

By performing DFE control of the second and subsequent post-taps, and pre-emphasis control of the pre-tap, from a non-equalized state of FIG. 12, the waveform at the edge clock timing undergoes waveform equalization to a potential equivalent to the −1 level in FIG. 11. In the present proposed method, the first post-tap is only affected to some extent by the pre-tap control, and the potential of the first post-tap is not directly controlled in the decision feedback equalization (DFE). Thus as a substitute means therefor, the edge clock phase is controlled by a clock phase adjustment unit to a phase where the potential of the main tap and the potential of the first post-tap are equalized.

A description is given of an equalization operation of a waveform in a non-equalized state in FIG. 12, as an example. Binary decision results of each of waveforms (1) and (3) at the center clock timing before and after the main tap in the present state, and of a waveform (2) at the edge clock timing, being the main tap, are determined as being 0 for (1), 0 for (2), and 1 for (3). In the same way, binary decision results of each of waveforms (3) and (5) at center clock timing before and after the first post-tap, and of a waveform (4) at edge clock timing, being the first post-tap, are determined as being 1 for (3), 1 for (4), and 0 for (5). Accordingly, this state is a state of (1) in FIG. 9, and ×2 oversampling CDR of the clock phase adjustment unit advances clock phase in a down direction. As a result of this operation, by repeating a similar phase adjustment process, the clock phase is down and in a balanced state until the state of FIG. 13. At the same time as this operation, an equalization operation of ISI of the pre-tap and the second and subsequent post-taps is carried out by a pre-emphasis operation and a DFE operation.

As a result of the abovementioned operation, by using the clock control, a single bit response waveform is obtained in which a ternary decision of the single bit response is: the pre-tap=−1, the main tap=0, the first post-tap=0, and the second and subsequent post-taps=−1, and it is possible to perform waveform equalization to obtain a duo-binary signal.

As described above, according to the present exemplary embodiment it is possible to control waveform equalization of the first post-tap without using general decision feedback equalization or pre-emphasis equalization. The reason for this is that outside of the duo-binary signal ternary decision circuit, the clock phase adjustment circuit is used, so that by installing the binary decision circuit for detecting phase at 0 threshold at the same time and changing signal detection timing by phase adjustment of the edge timing clock, it is possible to equalize the potential of the first post-tap and main tap. By this fact, a limitation of decision feedback delay time of the first post-tap, which was a problem heretofore, is eliminated, and it is possible to realize further speeding up.

Second Exemplary Embodiment

Figure 14:
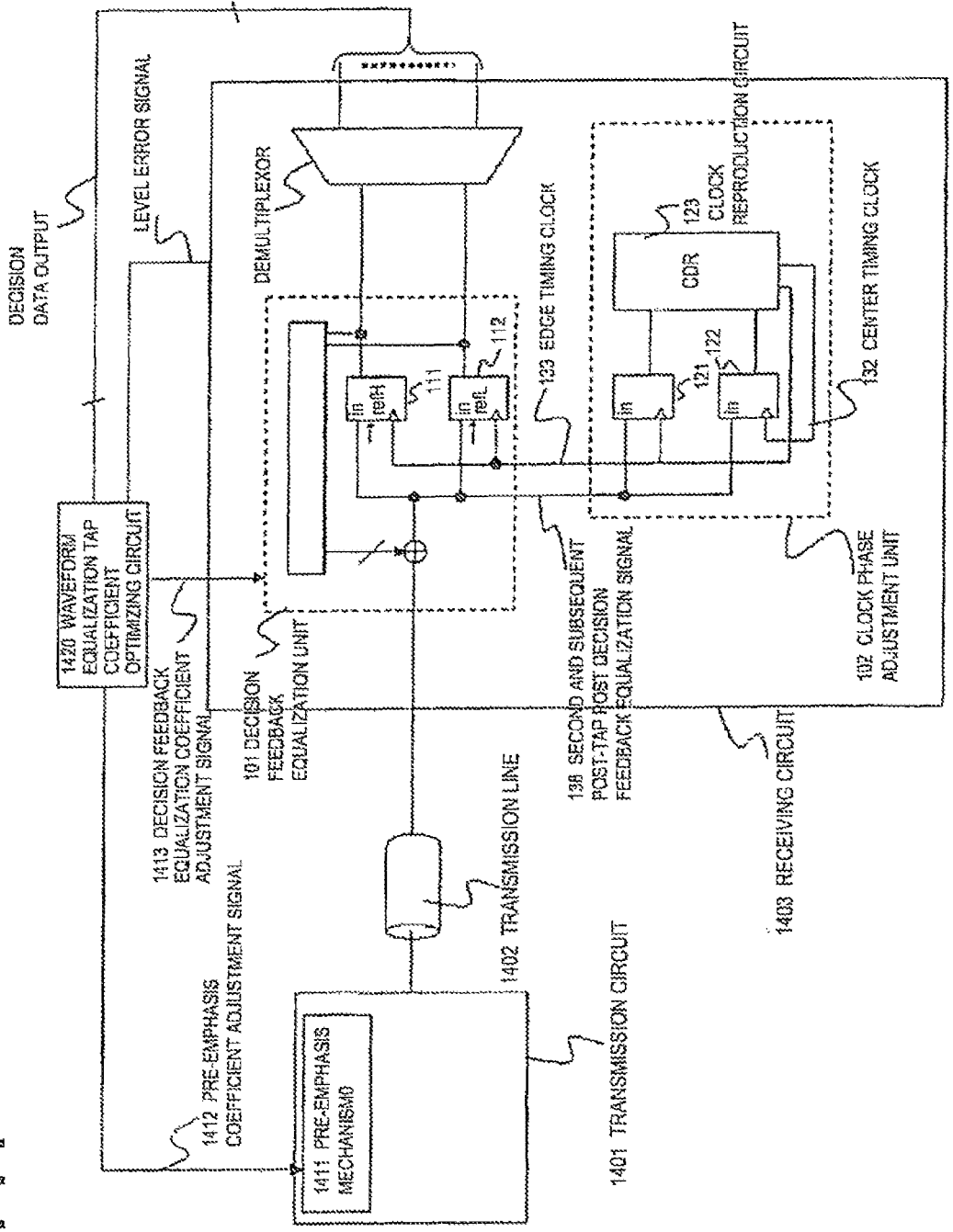
FIG. 14 is a drawing showing an example of a waveform equalization circuit in a second exemplary embodiment of the present invention.

FIG. 14 is a drawing showing a configuration of a waveform equalization circuit in a second exemplary embodiment of the present invention. The waveform equalization circuit according to the present exemplary embodiment is configured by a transmission circuit 1401 that includes a pre-emphasis mechanism 1411, a transmission path 1402, a receiving circuit 1403, and a waveform equalization tap coefficient optimizing circuit 1420. The receiving circuit 1403 has a mechanism for outputting a level error signal and necessary demultiplexed data to the tap coefficient optimizing circuit, besides blocks shown in the first exemplary embodiment.

In the waveform equalization circuit according to the present exemplary embodiment, two feedback loops are present: a feedback loop that uses coefficient control including the waveform equalization tap coefficient optimizing circuit 1420, and a control loop (CDR) that adjusts clock phase. In particular, a pre-emphasis tap coefficient control loop and a CDR feedback loop may interfere with one another, and optimal waveform equalization is not performed. A description is given below concerning problems related to this interference and a method of avoiding the problems.

Since in a transmission circuit, in general, maximum amplitude is stipulated by power supply voltage and the like, in a case where it is desired to transmit a single bit, it is necessary to perform waveform equalization such that a total value of amplitude assigned to a pre-tap and amplitude of a main tap is the maximum amplitude of a single bit response. As a result, if a waveform equalization coefficient for pre-tap ISI elimination increases, main tap output amplitude decreases, and receiving signal amplitude of the receiving circuit decreases.

Figure 15:
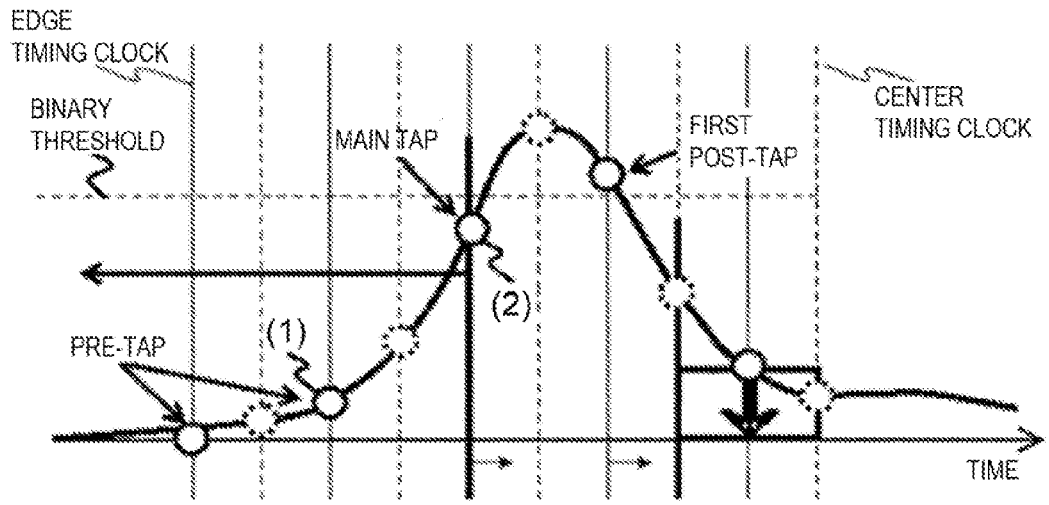
FIG. 15 is a drawing showing an example of a single bit response before waveform equalization in the second exemplary embodiment.
Figure 15:
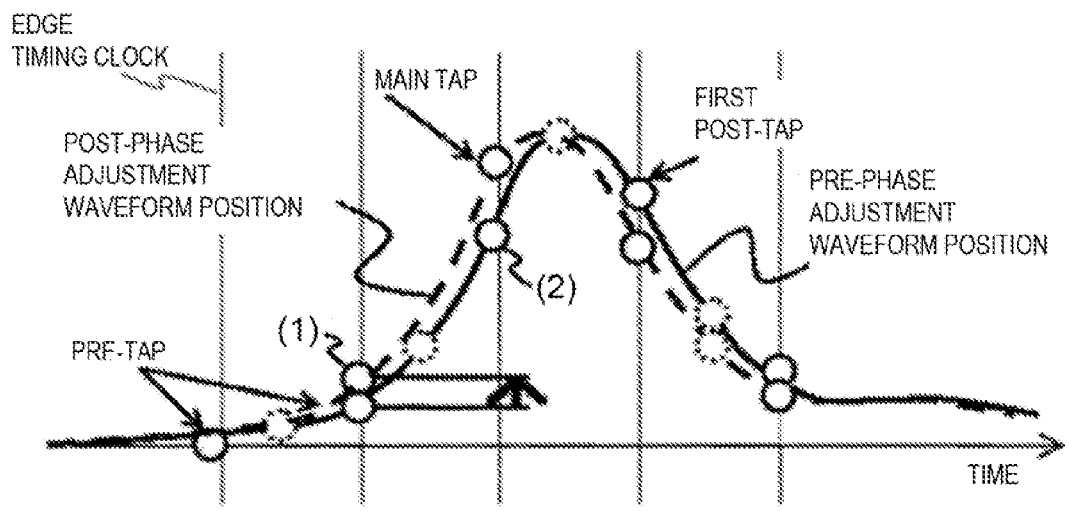

A description is given using FIG. 15 concerning interference of control of two loops. If a single bit response as in a thick solid line in FIG. 15 is in accordance with operation of the first exemplary embodiment, and from this state a clock is delayed by clock phase control (right direction of the drawing), the data phase advances relatively (left direction in the drawing). A waveform before and after the clock is delayed, together with clock timing, is shown in FIG. 15. A solid line shows the situation before control, and an dashed line shows the situation after control. As a result, since amount of pre-tap (1) ISI increases, by pre-emphasis tap coefficient control, an absolute value of the pre-tap coefficient increases and the main tap coefficient decreases. In order that this decreased main tap potential and a first post-tap potential become equal, in addition an operation is repeated in which the CDR control loop adjusts the clock phase. Therefore, there is a possibility that received amplitude deceases excessively due to the loop control interference.

Accordingly, with regard to a time constant of the pre-emphasis control loop in waveform equalization to obtain a duo-binary waveform in the present proposal, by increasing the time constant of a clock phase adjustment loop of the CDR, it is possible to reduce an effect due to interference to a level at which there is effectively no problem, and it is possible to avoid a decrease in the amplitude.

A method of adjusting the time constant is a method in which a count number of each loop is adjusted, and the time constant of the CDR is increased. This can be realized by adjusting a counter inside CDR logic 810 in FIG. 8, and a counter inside the waveform equalization tap coefficient optimizing circuit 1420 of FIG. 14.

Furthermore, with regard to the abovementioned loop interference, in a case where there is pre-tap intersymbol interference (ISI), there is interference with CDR loop control. As a result, by controlling the CDR loop with a data pattern with small pre-tap intersymbol interference, it is possible to reduce the effect of interference. Furthermore, in general, in a case where autocorrelation of input data is high in the waveform equalization tap coefficient optimizing circuit 1420, a mechanism is used in which tap coefficient adjustment is paused. As a result, an optimizing control loop only operates when there is data that is highly random. By using a characteristic of this CDR 123 and the waveform equalization tap coefficient optimizing circuit 1420, it is possible to avoid the loop interference.

That is, a control loop is selected by an input data pattern when a tap coefficient is optimized. As an example, a description is given concerning selection of a control loop according to a toggle pattern (repetition of 01), and a random or pseudo-random pattern.

Since in the toggle pattern, data changes alternately with bit period, there is almost no occurrence of intersymbol interference (ISI) due to a difference in transmission characteristic according to frequency component including signals. As a result, the pre-emphasis tap coefficient optimizing control loop hardly operates, and control of only the CDR loop is performed. Furthermore, since, with regard to the first post-tap in the waveform equalization in the present invention, control is not performed with pre-emphasis nor with decision feedback equalization (DFE), it is desirable to perform control of the CDR in a state where the first post-tap intersymbol interference is small.

Furthermore, in the random pattern, since the intersymbol interference is large, the coefficient is updated frequently in the pre-emphasis tap coefficient optimizing control loop, and on the other hand, there is almost no phase control by the CDR according to a counter or a low-pass filter in CDR logic, since the CDR loop has random variation due to the intersymbol interference. As a result, by using a data pattern that mixes a random pattern and a toggle pattern when performing optimizing adjustment of the waveform equalization tap coefficient, it is possible to prevent the abovementioned interference.

As described above, according to the present exemplary embodiment, compared to the waveform equalization by only pre-emphasis of the transmission circuit, it is possible to enlarge an eye opening before a signal decision. The reason for this is that, although pre-emphasis mechanisms in recent years distribute maximum amplitude given to 1 bit to respective taps and realize waveform equalization by overall amplitude decrease, in the first post-tap in which a particularly large equalization amount is necessary, since in the present invention it is possible to perform equalization in clock control with no control of voltage direction, it is possible to enlarge the eye opening of the received signal. Thus, this leads to pre-emphasis tap data generation circuit reduction, which is a problem with regard to transmission circuits in high speed serial communication, and it is possible to reduce circuit area.

Furthermore, according to the first and second exemplary embodiments of the present invention, it is possible to reduce electrical power of the receiving circuit. The reason for this is that increase in amplifier power and signal decision circuit for a high speed feedback loop required in the first post-tap decision feedback equalization unit, which is a conventional problem, can be realized by using a clock reproduction circuit, which is necessary in the receiving circuit, so that a high speed dedicated circuit becomes unnecessary, and it is possible to reduce power consumption with regard to the high speed dedicated circuit.

Third Exemplary Embodiment

In a third exemplary embodiment, a description is given concerning an apparatus configuration characterized by individually feeding back in only a feedback path with the shortest feedback time limitation, and in which load of the feedback path with the shortest feedback time limitation is improved. In the present exemplary embodiment, a second post-tap as in the first exemplary embodiment corresponds to this feedback path with the shortest feedback time limitation, and this is shown as an example of the exemplary embodiment. Therefore, there is no limitation to the second post-tap. Furthermore, in a differential signal below, for convenience, a high potential is represented by 1 and a low potential is represented by 0.

Figure 16:
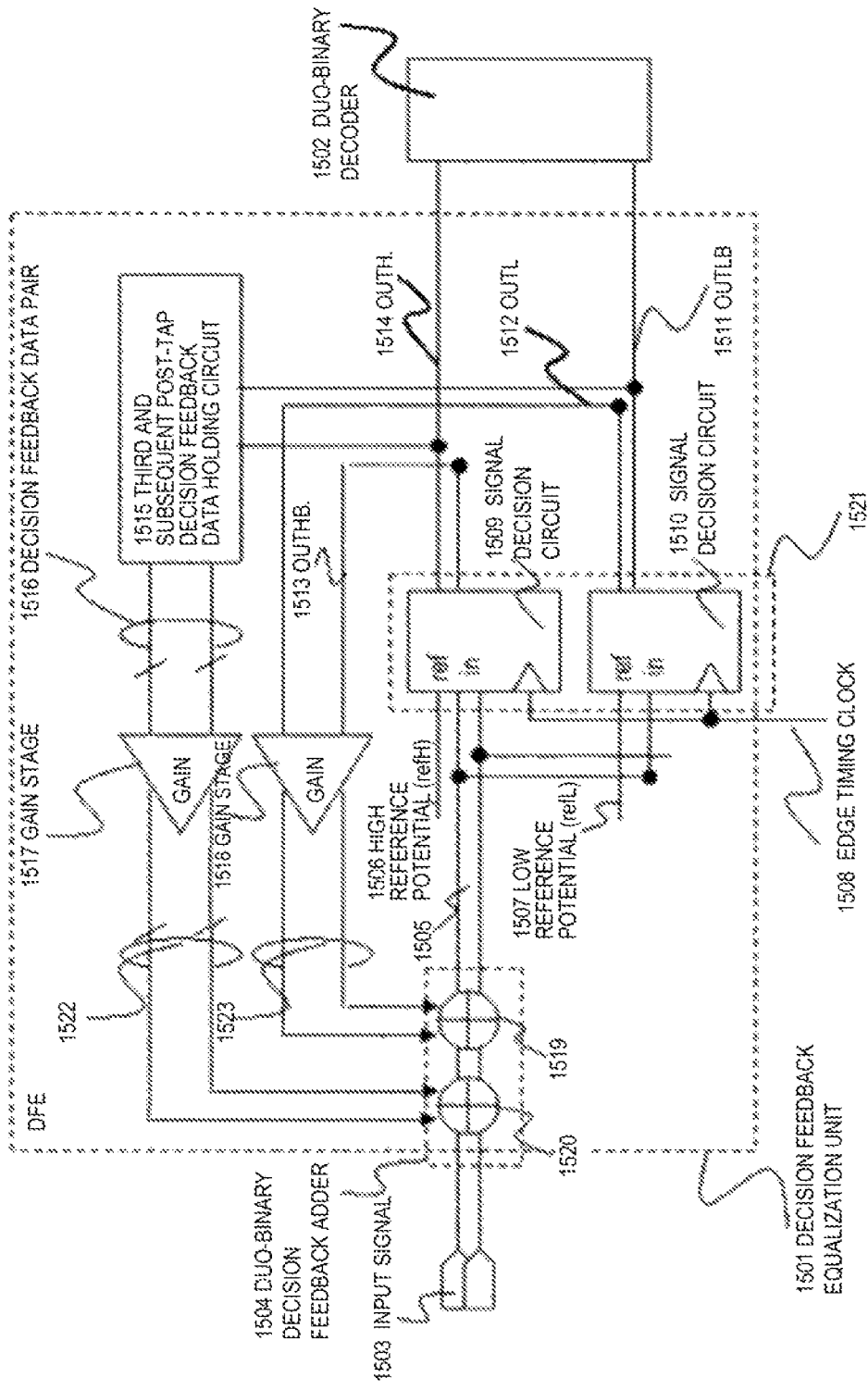
FIG. 16 is a drawing showing an example of a waveform equalization circuit in a third exemplary embodiment of the present invention.

FIG. 16 shows an exemplary embodiment of a differential configuration. The present exemplary embodiment is configured from a decision feedback equalization unit 1501, a duo-binary decoder 1502, and a differential input signal 1503. The decision feedback equalization unit 1501 includes two signal decision circuits 1509 and 1510 that make a decision concerning a ternary value at edge timing; a third and subsequent post-tap decision feedback data holding circuit 1515 that holds data for decision feedback equalization of a decision result of the two signal decision circuits 1509 and 1510; gain stages 1517 and 1518, and a duo-binary decision feedback adder 1504. The duo-binary decision feedback adder 1504 includes a second post-tap dedicated adder 1519, and an adder 1520 of third and subsequent post-taps.

An input signal 1503 is added to a decision feedback signal in the duo-binary decision feedback adder 1504 of the decision feedback equalization unit 1501, and equalized to obtain a duo-binary waveform 1505. This duo-binary waveform 1505 is inputted in parallel to signal decision circuits 1509 and 1510.

Figure 17:
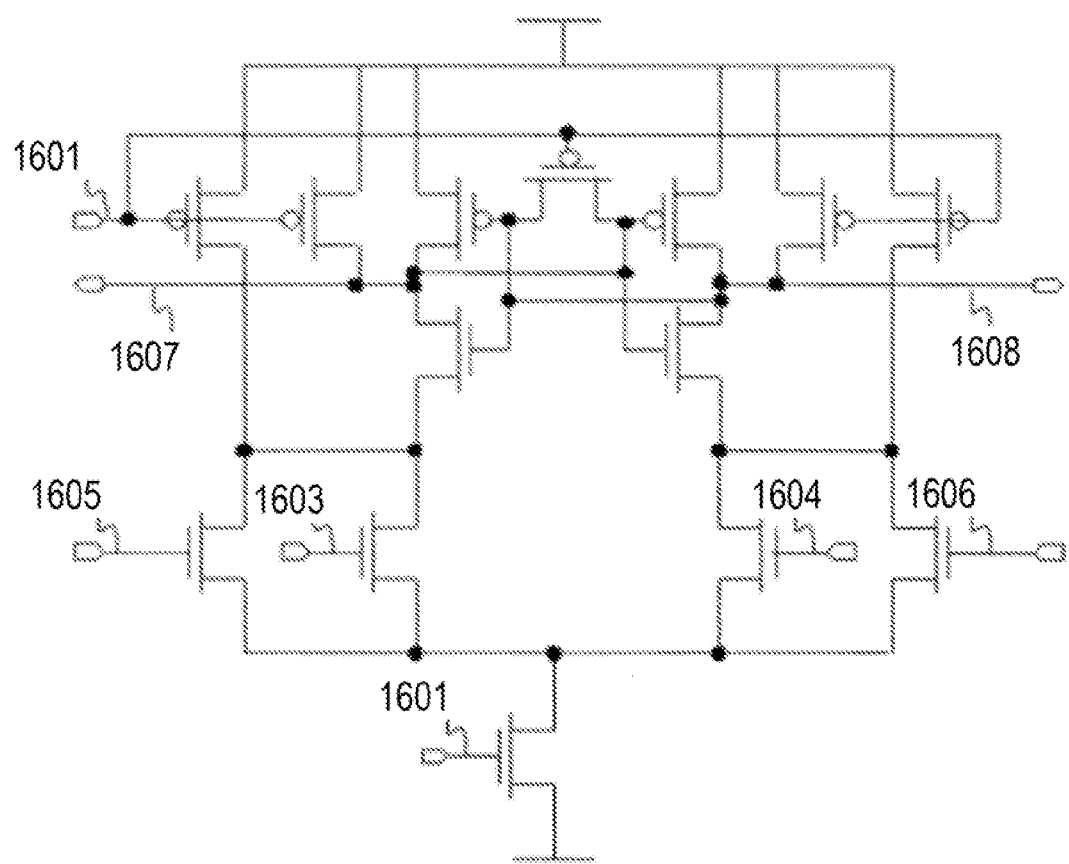
FIG. 17 is a drawing showing an example of a signal decision unit in the third exemplary embodiment.

An exemplary embodiment of a sampling latch generally used in the signal decision circuits 1509 and 1510 is shown in FIG. 17. This sampling latch is a circuit that determines differential input, and latches a differential output amplitude to a power supply potential and a ground potential. Since this circuit is a precharge type of latch, the latch holding data is generally connected to output.

A ternary signal decision unit 1521 is configured by the two signal decision circuits 1509 and 1510 having a high reference potential 1506 (refH) and a low reference potential 1507 (refL) as thresholds. The signal decision circuit 1509 makes a decision concerning the duo-binary waveform 1505 with the high reference potential 1506 as a threshold, and outputs a result thereof as a difference (OUTH 1514 and OUTHB 1513). The signal decision circuit 1510 makes a decision concerning the duo-binary waveform 1505 with the low reference potential 1507 as a threshold, and outputs a result thereof as a difference (OUTL 1512 and OUTLB 1511). OUTL 1512 and OUTHB 1513 are inputted to a gain stage 1518, and OUTLB 1511 and OUTH 1514 are inputted to a third and subsequent post-tap decision feedback data holding circuit 1515. Output of the gain stage 1518 is inputted to a second post-tap dedicated adder 1519.

Figure 18:
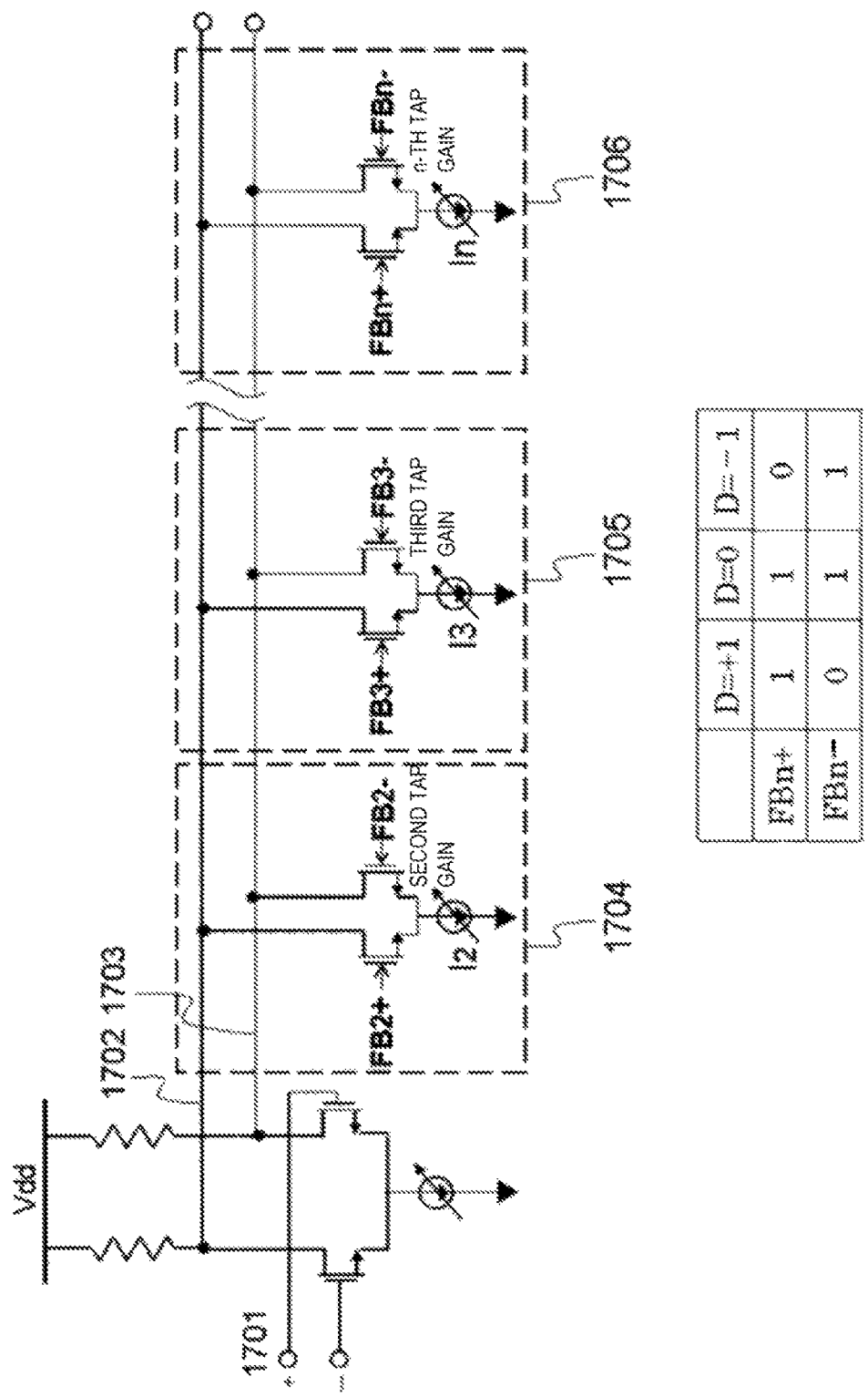
FIG. 18 is a drawing showing an example of a duo-binary decision feedback adder in the third exemplary embodiment.

The gain stages 1517 and 1518 and the duo-binary decision feedback adder 1504 can generally be realized by a differential circuit configuration shown in FIG. 18. The gain stage 1518 and the second post-tap dedicated adder 1519 correspond to a circuit configuration of a second post-tap ISI correction unit 1704. The gain stage 1517 and the third and subsequent post-tap adder 1520 correspond to a third post-tap ISI correction unit 1705 and an n-th post-tap ISI correction unit 1706. OUTL 1512 is connected to input FB2+ of the second post-tap adder of FIG. 18, and OUTHB 1513 is connected to input FB2− of the second post-tap adder.

A description is given using FIG. 18 concerning a second post-tap dedicated duo-binary decision feedback adder 1519 for respective cases of ternary decision data having data levels of D=+1, D=0, and D=−1 in FIG. 6. In the case of a decision of D=+1, 1 is inputted to FB2+ and 0 is inputted to FB2−, and voltage corresponding to I2 is added to SUMOUT 1702. Similarly, in the case of a decision of D=−1, 0 is inputted to FB2+ and 1 is inputted to FB2−, and voltage corresponding to I2 is added to SUMOUT 1703. In the case of a decision of D=0, 1 is inputted to FB2+ and 1 is inputted to FB2−, and voltage corresponding to half of I2 is added to both SUMOUT 1702 and SUMOUTB 1703. As a result, SUMOUT 1702 and SUMOUTB 1703 are equalized to obtain a duo-binary waveform, without varying common potential.

A table described in a lower part of FIG. 18 describes operation of an adder with regard to ternary decision data.

In the present exemplary embodiment, by individually feeding back one of differential output to only the second post-tap, load in the second post-tap is reduced, and also it is possible to reduce the number of transistor stages for duo-binary adder input; a problem of delay time increase due to higher speed is solved; and high speed feedback is possible. Furthermore, by extracting the same current by differentiating control when D=0, it is possible to inhibit common potential variation of the duo-binary waveform after equalization.

Descriptions have been given above according to the abovementioned exemplary embodiments of the present invention, but the present invention is not limited to only configurations of the abovementioned exemplary embodiments, and clearly includes every type of transformation and modification that a person skilled in the art can realize within the scope of the present invention.

Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the art can realize according to technological concepts and the entire disclosure including the scope of the claims.

EXPLANATION OF SYMBOLS 100 input signal
101 decision feedback equalization unit
102 clock phase adjustment unit
103 duo-binary decoder
111 ternary signal decision circuit
112 ternary signal decision circuit
113 decision feedback data holding circuit
114 gain stage
115 duo-binary decision feedback adder
121 binary signal decision circuit
122 binary signal decision circuit
123 clock reproduction circuit (CDR)
131 feedback equalized signal
132 center timing clock
133 edge timing clock
134 low reference potential
135 medium reference potential 136 high reference potential
138 second and subsequent post-tap post decision feedback equalization signal
141 ternary decision result
142 ternary decision result
201 eye opening region
311 register group
312 decision feedback equalization clock
321 decision feedback data pair group
701 differential input signal pair
702 added signal differential output pair
703 common mode negative feedback unit
1401 transmission circuit
1402 transmission line
1403 receiving circuit
1411 pre-emphasis mechanism
1420 waveform equalization tap coefficient optimizing circuit
1501 decision feedback equalization unit
1502 duo-binary decoder
1503 input signal
1504 duo-binary decision feedback adder
1505 duo-binary waveform
1506 high reference potential
1507 low reference potential
1508 edge timing clock
1509 symbol decision circuit
1510 symbol decision circuit
1511 OUTLB
1512 OUTL
1513 OUTHB
1514 OUTH
1515 third and subsequent post-tap decision feedback data holding circuit
1516 decision feedback data pair
1517 gain stage
1518 gain stage
1519 second post-tap dedicated adder
1520 third and subsequent post-tap adder
1521 ternary signal decision unit
1522 decision feedback data pair
1523 decision feedback data pair
1601 clock
1603 differential input
1604 differential input
1605 reference potential
1606 reference potential
1607 differential output
1608 differential output
1701 differential data input
1702 SUMOUT
1703 SUMOUTB

The invention claimed is:

1. A waveform equalization circuit comprising:
a clock phase adjustment circuit that controls clock phase of a receiving circuit and changes signal detection timing to control a first post-tap intersymbol interference in a received duo-binary signal; and
a decision feedback equalization circuit that performs decision feedback equalization of second and subsequent post-tap intersymbol interferences in the received duo-binary signal,
wherein sampling the duo-binary signal by an edge timing clock represents a first transmitted data value when a potential of the duo-binary signal at the time of sampling is between a first reference level and a second reference level, and represents a second transmitted data value when the potential of the duo-binary signal at the time of sampling is higher than the first reference level and lower than the second reference level, and
wherein the first reference level is greater than the second reference level.

2. The waveform equalization circuit of claim 1, further comprising a signal detection circuit that performs a ternary decision on the duo-binary signal that has undergone equalization by using the edge timing clock.

3. The waveform equalization circuit of claim 2, further comprising an ×2 over-sampling clock reproduction circuit (CDR) having input of binary decision data detected by the edge timing clock and a center timing clock, or a data group obtained by demultiplexing this data.

4. The waveform equalization circuit of claim 1, further comprising a mechanism that detects a phase of the edge timing clock at zero threshold.

5. The waveform equalization circuit of claim 4, wherein detecting the phase of the edge timing clock is performed by oversampling with respect to symbol rate.

6. The waveform equalization circuit of claim 1, further comprising:
a first signal detection circuit that receives the duo-binary signal that has undergone equalization and performs a ternary decision on the duo-binary signal using the edge timing clock;
a second signal detection circuit that receives the duo-binary signal that has undergone equalization and performs a binary decision on the duo-binary signal using the edge timing clock; and
a third signal detection circuit that receives the duo-binary signal that has undergone equalization and performs a binary decision on the duo-binary signal by using a center timing clock,
wherein said clock phase adjustment circuit controls said clock phase and changes said signal detection timing based on said binary decisions of said second signal detection circuit and said third signal decision circuit, and
wherein said decision feedback equalization circuit performs said decision feedback equalization based on said ternary decision of said first signal detection circuit.

7. The waveform equalization circuit of claim 6, further comprising an ×2 over-sampling clock reproduction circuit (CDR) having input of binary decision data detected by said second detection circuit and said third detection circuit, or a data group obtained by demultiplexing said decision data.

8. The waveform equalization circuit of claim 6, further comprising a plurality of decision feedback data paths for decision feedback equalization, wherein said plurality of decision feedback data paths comprise a first decision feedback data path for decision feedback equalization of second post-tap intersymbol interference, which is independent of another or the others of said plurality of decision feedback data path(s).

9. The waveform equalization circuit of claim 6, wherein:
if a signal level of the duo-binary signal at the edge timing clock is higher than the first reference level, a data value of 1 is fed back to a positive input and 0 is fed back to a negative input of a decision feedback signal differential pair of a duo-binary decision feedback adder,
if the signal level of the duo-binary signal at the edge timing clock is lower than the second reference level, a data value of 0 is fed back to the positive input and 1 is fed back to the negative input and, if the signal level of the duo-binary signal is between the first reference level and the second reference level, a data value of 1 is fed back to the positive input and the negative input.

10. The waveform equalization circuit of claim 1, wherein, in decision feedback equalization, only a feedback path in which a decision feedback time limitation is shortest is fed back independently from another feedback path.

11. The waveform equalization circuit of claim 1, comprising a decision feedback data path for decision feedback equalization of second post-tap intersymbol interference, which is independent of a data path group for decision feedback equalization of third and subsequent post-tap intersymbol interference.

12. The waveform equalization circuit of claim 1, wherein:
if a signal level of the duo-binary signal at the edge timing clock is higher than the first reference level, a data value of 1 is fed back to a positive input and 0 is fed back to a negative input of a decision feedback signal differential pair of a duo-binary decision feedback adder,
if the signal level of the duo-binary signal at the edge timing clock is lower than the second reference level, a data value of 0 is fed back to the positive input and 1 is fed back to the negative input, and
if the signal level of the duo-binary signal is between the first reference level and the second reference level, a data value of 1 is fed back to the positive input and the negative input.

13. The waveform equalization circuit of claim 1, wherein the clock phase adjustment circuit controls the clock phase of the receiving circuit such that a main tap timing and a first post-tap timing of the edge timing clock correspond to a zero threshold.

14. The waveform equalization circuit of claim 1, wherein the first transmitted data value is a 1 and the second transmitted data value is a 0.

15. A waveform equalization method comprising,
controlling clock phase of a receiving circuit and changing signal detection timing to control first post-tap intersymbol interference in a received duo-binary signal; and
performing decision feedback equalization on the received duo-binary signal,
wherein sampling the duo-binary signal by an edge timing clock represents a first transmitted data value when a potential of the duo-binary signal at the time of sampling is between a first reference level and a second reference level, and represents a second transmitted data value when the potential of the duo-binary signal at the time of sampling is higher than the first reference level and lower than the second reference level, and
wherein the first reference level is greater than the second reference level.

16. The waveform equalization method of claim 15, further comprising:
performing equalization by pre-emphasis on a transmission side with regard to pre-tap intersymbol interference.

17. The waveform equalization method of claim 15, wherein controlling the clock phase and changing the signal detection timing includes controlling the clock phase such that a main tap timing and a first post-tap timing of the edge timing clock correspond to a zero threshold.

18. The waveform equalization method of claim 15, wherein the first transmitted data value is a 1 and the second transmitted data value is a 0.

19. A data transmission system comprising:
a transmission circuit that performs pre-emphasis on a duo-binary signal to be output to a transmission line;
a receiving circuit coupled to said transmission circuit through said transmission line, said receiving circuit comprising:
a decision feedback equalization circuit that feeds back and equalizes the duo-binary signal received from said transmission circuit through said transmission line, and
a clock phase adjustment circuit that equalizes the received duo-binary signal by adjusting a phase of an edge timing clock of the receiving circuit; and
a waveform equalization tap coefficient control circuit that controls a tap on which said transmission circuit performs pre-emphasis based on a feedback equalization count of said decision feedback equalization circuit,
wherein sampling the duo-binary signal by the edge timing clock represents a first transmitted data value when a potential of the duo-binary signal at the time of sampling is between a first reference level and a second reference level, and represents a second transmitted data value when the potential of the duo-binary signal at the time of sampling is higher than the first reference level and lower than the second reference level, and
wherein the first reference level is greater than the second reference level.

20. The data transmission system of claim 19, wherein:
said transmission circuit performs the pre-emphasis with regard to a pre-tap of said duo-binary signal,
said clock phase adjustment circuit equalizes the received duo-binary signal without performing equalization by said decision feedback equalization circuit with regard to a first post-tap of said duo-binary signal, and
said decision feedback equalization circuit equalizes the received duo-binary signal for second and subsequent post-taps of said duo-binary signal.

21. The data transmission system of claim 20, wherein a time constant of an adjustment loop of said clock phase adjustment circuit is larger than a time constant of an adjustment loop of said waveform equalization tap coefficient control circuit.

22. The data transmission system of claim 19, wherein a time constant of an adjustment loop of said clock phase adjustment circuit is larger than a time constant of an adjustment loop of said waveform equalization tap coefficient control circuit.

23. The data transmission system of claim 19, wherein the first transmitted data value is a 1 and the second transmitted data value is a 0.

* * * * *